US012596903B2

(12) United States Patent
Schmidt et al.

(10) Patent No.: US 12,596,903 B2
(45) Date of Patent: Apr. 7, 2026

(54) ATTACHMENT MANAGEMENT SYSTEM

(71) Applicant: Great Plains Manufacturing, Inc., Salina, KS (US)

(72) Inventors: Zachary Schmidt, Salina, KS (US); Yuji Fukuda, Salina, KS (US); Elizabeth Baker, Flower Mound, TX (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 18/813,225

(22) Filed: Aug. 23, 2024

(65) Prior Publication Data

US 2026/0057205 A1 Feb. 26, 2026

(51) Int. Cl.
| | |
|---|---|
| *G06K 19/07* | (2006.01) |
| *G05D 1/224* | (2024.01) |
| *G05D 105/05* | (2024.01) |
| *G05D 111/30* | (2024.01) |
| *G06K 19/06* | (2006.01) |

(Continued)

(52) U.S. Cl.
CPC ....... *G06K 19/0723* (2013.01); *G05D 1/2246* (2024.01); *G06K 19/06028* (2013.01); *H04B 17/318* (2015.01); *H04W 4/025* (2013.01); *H04W 4/40* (2018.02); *H04W 4/80* (2018.02); *G05D 2105/05* (2024.01); *G05D 2111/34* (2024.01)

(58) Field of Classification Search
CPC ................................................... G06K 19/0723
See application file for complete search history.

(56) References Cited

U.S. PATENT DOCUMENTS

| | | | | |
|---|---|---|---|---|
| 11,281,955 | B2 * | 3/2022 | Saenz | ................ G06K 19/0723 |
| 2010/0238001 | A1 | 9/2010 | Veskovic | |

(Continued)

FOREIGN PATENT DOCUMENTS

| | | |
|---|---|---|
| CN | 118075684 A | 5/2024 |

OTHER PUBLICATIONS

PCT Search Report and Written Opinion dated Dec. 15, 2025 for related PCT Patent Application No. PCT/US2025/043187, 11 pages.

*Primary Examiner* — Davetta W Goins
*Assistant Examiner* — Pameshanand Mahase
(74) *Attorney, Agent, or Firm* — Hovey Williams LLP; Kameron D. Kelly

(57) ABSTRACT

An attachment management system comprises a working vehicle, a plurality of attachments, a mobile terminal, and a plurality of communication tags fixed on the attachments to communicate with the mobile terminal through a wireless signal that is compliant with a near field communication standard. The mobile terminal is switchable between a first mode to receive the wireless signals from the communication tags and a second mode to receive the wireless signals from the communication tags and to transmit attachment information. The mobile terminal displays, in the first mode, tag identifiers and a plurality of pieces of attachment information stored in the tag memories of the communication tags, and in the second mode, the tag identifiers and the plurality of pieces of attachment information stored in the tag memories of the communication tags which transmit the wireless signals each having signal intensity equal to or greater than a predetermined threshold.

31 Claims, 15 Drawing Sheets

(51) Int. Cl.
    *H04B 17/318*         (2015.01)
    *H04W 4/02*          (2018.01)
    *H04W 4/40*          (2018.01)
    *H04W 4/80*          (2018.01)

(56)                   References Cited

U.S. PATENT DOCUMENTS

2015/0284935  A1     10/2015  Egger et al.
2017/0061175  A1      3/2017  Lee
2018/0321356  A1 *   11/2018  Kulkarni ............. H04W 64/003
2019/0284784  A1      9/2019  Darlington et al.
2019/0362304  A1 *   11/2019  Vivas Suarez ........... G06K 7/00
2022/0116898  A1 *    4/2022  Ying .................... H04W 24/10
2022/0191956  A1 *    6/2022  Manthrayil Sachidanandan .........
                                                       H04W 4/80

* cited by examiner

100

50

Server Storage — 52

Vehicle — 1

Vehicle Communicator — 27
Beacon Scanner — 24
Vehicle Storage — 23
Vehicle Interface — 25
Positioning Device — 26

Vehicle Controller — 21
Internal Memory — 22

Attachment 1-N — 30

Beacon Tag — 33
Microcomputer — 31
Tag Transceiver — 34
Tag Memory — 32
Battery — 36

Mobile Terminal — 40

Terminal Controller — 41
Terminal Communicator — 47
Terminal Transceiver — 44
Terminal Interface — 42
Camera — 46

Beacon Signal

| Header | Tag ID | Attachment Infomation (including Att. ID, Att. Type, Att. Model, etc.) |
|--------|--------|----------------------------------------------------------------------|

Fig.5

Mode Selection Screen M1

| Mode Selection |
|---|

| Tag Detection Mode | Tag Setting Mode |
|---|---|

| END |
|---|

Fig.6

Tag Detection Screen M2

| Tag ID | RSSI | Att. ID | Att. Type | Att. Model |
|--------|------|---------|-----------|------------|
| T#8636 | 7 | A#3864 | Hole Digger | SA35 |
| T#5491 | 7 | A#6845 | Skid Cutter | SC25 |
| T#4051 | 6 | N/A | N/A | N/A |
| T#8397 | 5 | N/A | N/A | N/A |
| T#5754 | 5 | A#2678 | Flail Mower | OFM36 |
| T#7313 | 5 | A#1836 | Rotary Tiller | RTR2072 |
| T#2519 | 4 | A#9810 | Flail Mower | OFM26 |
| T#6694 | 4 | A#3687 | Hole Digger | PD35 |
| T#8603 | 3 | N/A | N/A | N/A |
| T#7176 | 3 | A#4063 | Rotary Tiller | RCR1884 |

| Tag Seting Mode | Back |
|-----------------|------|

Fig.7

Tag Setting Screen M3

| Tag ID | RSSI |
|--------|------|
| T#8636 | 7 |
| T#5491 | 7 |
| T#4051 | 6 |

Attachment Information
Input Screen M31

| Tag ID | RSSI |
|--------|------|
| T#8636 | 7 |
| T#5491 | 7 |
| T#4051 | 6 |

Fig.9

Input Completion Screen M32

| Tag ID | RSSI | Att. ID | Att. Type | Att. Model |
|--------|------|---------|-----------|------------|
| T#8636 | 7 | A#3864 | Hole Digger | SA35 |

Attachment Information
Input Screen M4

| Tag ID | RSSI |
|--------|------|
| T#8636 | 10 |
| T#5491 | 4 |
| T#4051 | 3 |

Obtain Attachment Information

Fig.11A

List Screen M5

| Vehicle ID | Position Infomation | Att. ID | Att. Type | Att. Model |
|---|---|---|---|---|
| V#3135 | RCX7+M3, Salina, KS | A#3864 | Hole Digger | SA35 |
| V#9003 | HCXH+94, Sakai, Osaka | A#3423 | Skid Cutter | SC25 |
| V#9492 | RW2P+G9, Alexandria, VA | A#6845 | N/A | N/A |
| V#6769 | BBBB+bb, San Jose, SF | A#3518 | N/A | N/A |
| V#1673 | CCCC+cc, Sakai, Osaka | A#7058 | Flail Mower | OFM36 |
| V#4315 | AAAA+aa, Salina, KS | A#5020 | Rotary Tiller | RTR2072 |
| V#6727 | BBBB+bb, Sanjose, SF | A#4125 | Flail Mower | OFM26 |
| V#6211 | CCCC+cc, Sakai, Osaka | A#9798 | Hole Digger | PD35 |
| V#2450 | BBBB+bb, Sanjose, SF | A#2775 | N/A | N/A |
| V#3838 | AAAA+aa, Salina, KS | A#2581 | Rotary Cutter | RCR1884 |
| . | . | . | . | . |
| . | . | . | . | . |
| . | . | . | . | . |

Fig.12

Position-Limited List Screen M51

| Vehicle ID | Position Information | Att. ID | Att. Type | Att. Model |
|---|---|---|---|---|
| V#3135 | RCX7+M3, Salina, KS | A#3864 | Hole Digger | SA35 |
| V#5517 | RCX7+M3, Salina, KS | A#3687 | Hole Digger | PD35 |
| V#9517 | RCX7+M3, Salina, KS | A#5097 | Hole Digger | HD35 |
| V#1627 | RCX7+M3, Salina, KS | A#4783 | Hole Digger | PD15 |
| V#1623 | RCX7+M3, Salina, KS | A#1836 | Rotary Cutter | RC5020 |
| V#1115 | RCX7+M3, Salina, KS | A#4063 | Rotary Cutter | RCR1884 |
| V#3011 | RCX7+M3, Salina, KS | A#6845 | Skid Cutter | SC25 |
| V#6285 | RCX7+M3, Salina, KS | A#1970 | Skid Cutter | SC40 |
| . | . | . | . | . |
| . | . | . | . | . |
| . | . | . | . | . |
| . | . | . | . | . |
| . | . | . | . | . |

Fig.13

Type-Limited List Screen M52

| Vehicle ID | Position Information | Att. ID | Att. Type | Att. Model |
|---|---|---|---|---|
| V#1623 | RCX7+M3, Salina, KS | A#1836 | Rotary Cutter | RC5020 |
| V#1115 | RCX7+M3, Salina, KS | A#4063 | Rotary Cutter | RCR1884 |
| · | · | · | · | · |
| · | · | · | · | · |
| · | · | · | · | · |

Obtain Attachment Information

Hybrid Tag Detection Screen M6

| Vehicle ID | Position Information | Tag ID | RSSI | Att. ID | Att. Type | Att. Model |
|---|---|---|---|---|---|---|
| V#3135 | RCX7+M3, Salina, KS | T#8636 | N/A | A#3864 | Hole Digger | SA35 |
| V#3135 | RCX7+M3, Salina, KS | T#6694 | N/A | A#3687 | Hole Digger | PD35 |
| V#3135 | RCX7+M3, Salina, KS | T#3615 | N/A | A#5097 | Hole Digger | HD35 |
| V#3135 | RCX7+M3, Salina, KS | T#1063 | N/A | A#4783 | Hole Digger | PD15 |
| V#3135 | RCX7+M3, Salina, KS | T#7313 | N/A | A#1836 | Rotary Tiller | RTR2072 |
| V#3135 | RCX7+M3, Salina, KS | T#7176 | N/A | A#4063 | Rotary Cutter | RCR1884 |
| V#3135 | RCX7+M3, Salina, KS | T#5491 | N/A | A#6845 | Skid Cutter | SC25 |
| N/A | RCX7+M3, Salina, KS | T#2035 | 7 | A#3864 | Hole Digger | SA35 |
| N/A | RCX7+M3, Salina, KS | T#5491 | 7 | A#6845 | Skid Cutter | SC25 |
| N/A | RCX7+M3, Salina, KS | T#5754 | 5 | A#2678 | Flail Mower | OFM36 |
| N/A | RCX7+M3, Salina, KS | T#7313 | 5 | A#1836 | Rotary Tiller | RTR2072 |
| N/A | RCX7+M3, Salina, KS | T#6694 | 4 | A#3687 | Hole Digger | PD35 |
| N/A | RCX7+M3, Salina, KS | T#7176 | 3 | A#4063 | Rotary Cutter | RCR1884 |

Fig.14

ATTACHMENT MANAGEMENT SYSTEM

BACKGROUND OF THE INVENTION

1. Field of the Invention

The present invention relates to an attachment management system for managing a plurality of attachments detachably coupled to a working vehicle.

2. Description of the Related Art

The specification of U.S. Pat. No. 11,055,599 discloses a management system of a working machine including a working vehicle and a working device (attachment) coupled thereto, and in particular, in which a mobile terminal is configured to receive from a RFID (Radio Frequency Identification) tag mounted on the working device, a wireless signal containing a serial number of a RFID tag, and display one serial number corresponding to the working device on registration screen of the mobile terminal. In the management system, the mobile terminal is also configured to receives device information input by a user or the like, which includes specifications, a model name, a model type, a model number, etc., and store device information associated with the serial number of a RFID tag in a memory of the mobile terminal as well as in a server.

However, in a case where the user or even a rental company holds or possesses several working devices in a barn or garage, and the mobile terminal displays a single serial number of the working device, for example, it is difficult for the user or the like of the mobile terminal to recognize which one of the working devices or RFID tags thereon is displayed on the registration screen of the mobile terminal.

Thus, when a plurality of the working devices (attachments) are arranged around the mobile terminal, the serial number displayed on the registration screen of the mobile terminal does not always correspond to one for which the user or the like intends to input the device information through the mobile terminal. In other words, when a plurality of the RFID tags are provided around the mobile terminal, it is almost impossible for the user or the like of the mobile terminal to identify which one of the RFID tags is indicated with the single serial number on the registration screen of the mobile terminal. To be worse, if the serial number on the registration screen is inconsistent with one of the RFID tags to be mounted on the intended working device for which the user actually inputs the device information through the mobile terminal, wrong device information is associated to the serial number and stored in the memory and in the server. This causes the working device of the working machine to be controlled based on wrong device information or unintentional drive conditions, which may cause failures and/or malfunctions of the working device and/or working vehicle.

SUMMARY OF THE INVENTION

An attachment management system according to one aspect of the present invention comprises at least one working vehicle, a plurality of attachments, each of the plurality of attachments being detachably coupled to the at least one working vehicle, a mobile terminal having a terminal interface, and a plurality of communication tags, each of which is fixed to one of the plurality of attachments, and communicates with the mobile terminal through a wireless signal that is compliant with a near field communication standard, each of the plurality of communication tags including a tag memory to store a tag identifier unique to each of the plurality of communication tags, and a tag transceiver capable of transmitting the wireless signal containing the tag identifier to the mobile terminal, and receiving from the mobile terminal, attachment information unique to one of the plurality of attachments, on which each of the plurality of communication tags is fixed. The mobile terminal is switchable between a first mode where the mobile terminal receives the wireless signals from the plurality of communication tags and does not transmitting attachment information to the plurality of communication tags, and a second mode where the mobile terminal receives the wireless signals from the plurality of communication tags and is capable of transmitting attachment information to at least one of the plurality of communication tags. The mobile terminal is configured or programmed to display on the terminal interface, in the first mode, the tag identifiers and a plurality of pieces of attachment information stored in the tag memories of the plurality of communication tags which transmit the wireless signals, and in the second mode, the tag identifiers and the plurality of pieces of attachment information stored in the tag memories of the plurality of communication tags which transmit the wireless signals each having RSSIs (Received Signal Strength Indicator) equal to or greater than a predetermined threshold.

The mobile terminal may be configured or programmed to, in the first and second modes, sort and display on the terminal interface, the tag identifiers and the plurality of pieces of attachment information stored in the tag memories of the plurality of communication tags, based on the RSSIs of the wireless signals from the plurality of communication tags.

The mobile terminal may be configured or programmed to, in the second mode, allow an operator to select one of the tag identifiers displayed on the terminal interface, and obtain one of the plurality of pieces of attachment information corresponding to one of the tag identifiers selected by the operator through the terminal interface, and transmit the wireless signal containing the obtained one of the plurality of pieces of attachment information, from the terminal transceiver to the tag transceiver of one of the plurality of communication tags, to cause the tag memory thereof to store the obtained one of the plurality of pieces of attachment information.

The mobile terminal may be configured or programmed to, in the second mode, obtain one of the plurality of pieces of attachment information corresponding to the selected one of the tag identifiers through input operation of the operator on the terminal interface.

The mobile terminal may include a camera, and at least one of the plurality of attachments may include an image code recording one of the plurality of pieces of attachment information. The mobile terminal may be configured or programmed to, in the second mode, obtain the one of the plurality of pieces of attachment information corresponding to the selected one of the tag identifiers by scanning the image code with the camera.

The attachment management system may further comprise a server configured or programmed to store the plurality of pieces of attachment information containing attachment identifiers unique to each one of the plurality of attachments, and to communicate with a terminal communicator of the mobile terminal. The mobile terminal may be configured or programmed to, in the second mode, obtain one of the attachment identifiers corresponding to the selected one of the tag identifiers, obtain one of the plurality of pieces of attachment information containing the selected one of the tag identifiers by communicating with the server through the terminal communicator based on the obtained one of the attachment identifiers, and transmit the wireless signal containing the selected one of the tag identifiers and the obtained one of the plurality of pieces of attachment information, from the terminal transceiver to the tag transceiver of one of the plurality of communication tags, to cause the tag memory thereof to store the obtained one of the plurality of pieces of attachment information.

The mobile terminal may be configured or programmed to, in the second mode, obtain one of the plurality of pieces of attachment information corresponding to the selected one of the tag identifiers through input operation of the operator on the terminal interface.

The mobile terminal may include a camera, and at least one of the plurality of attachments may include an image code recording one of the plurality of pieces of attachment information The mobile terminal may be configured or programmed to, in the second mode, obtain one of the plurality of pieces of attachment information corresponding to the selected one of the tag identifiers by scanning the image code with the camera.

The attachment management system may further comprise a server including a sever storage to store the plurality of pieces of attachment information containing a plurality of attachment identifiers unique to each one of the plurality of attachments, the server communicating with a terminal communicator of the mobile terminal. The mobile terminal may include a terminal communicator and a terminal transceiver, and may be configured or programmed to obtain the plurality of pieces of attachment information stored in the sever storage by communicating with the server through the terminal communicator. The mobile terminal is configured or programmed to, in the second mode, allow an operator to select one of the tag identifiers displayed on the terminal interface, obtain one of the plurality of pieces of attachment information from the sever storage, corresponding to one of the tag identifiers selected by the operator through the terminal interface, and transmit the wireless signal containing obtained one of the plurality of pieces of attachment information, from the terminal transceiver to the tag transceiver of one of the plurality of communication tags, to cause the tag memory thereof to store the obtained one of the plurality of pieces of attachment information.

The attachment management system may further comprise a server to communicate with a terminal communicator of the mobile terminal. The at least one working vehicle may include a vehicle communicator to communicate with the server, and a vehicle storage to store a plurality of pieces of attachment information containing a plurality of attachment identifiers unique to each one of the plurality of attachments. The mobile terminal may include a terminal transceiver, and may be configured or programmed to obtain the plurality of pieces of attachment information stored in the vehicle storage by communicating with the vehicle storage via the terminal communicator, the server, and the vehicle communicator. The mobile terminal may be configured or programmed to, in the second mode, allow an operator to select one of the tag identifiers displayed on the terminal interface, obtain one of the plurality of pieces of attachment information from the vehicle storage corresponding to one of the tag identifiers selected by the operator through the terminal interface, and transmit the wireless signal containing obtained attachment information, from the terminal transceiver to the tag transceiver of one of the plurality of communication tags, to cause the tag memory thereof to store the obtained one of the plurality of pieces of attachment information.

The attachment management system may further comprise a server to communicate with a terminal communicator of the mobile terminal. The mobile terminal includes a terminal transceiver. The at least one working vehicle may include a positioning device providing a position information indicating a vehicle position thereof, a vehicle storage to store a plurality of pieces of attachment information of the plurality of attachments, and a vehicle communicator to communicate with the server, and transmits to the server, the plurality of pieces of attachment information linked with position information of the at least one working vehicle. The server may store the plurality of pieces of attachment information linked with position information of the at least one working vehicle, which are received from the vehicle communicator of the at least one working vehicle. The mobile terminal is configured or programmed to, in the second mode, allow an operator to select one of the plurality of pieces of attachment information displayed on the terminal interface, and transmit the selected one of the plurality of pieces of attachment information, from the terminal transceiver to the tag transceiver of one of the plurality of communication tags, to cause the tag memory thereof to store the selected one of the plurality of pieces of attachment information.

The attachment management system may further comprise a server to communicate with a terminal communicator of the mobile terminal. The mobile terminal may include a terminal transceiver. The at least one working vehicle may include a positioning device providing a position information indicating a vehicle position thereof, a vehicle storage to store a plurality of pieces of attachment information of the plurality of attachments, and a vehicle communicator to communicate with the server, and transmits to the server, the plurality of pieces of attachment information linked with position information of the at least one working vehicle. The server may store the plurality of pieces of attachment information linked with position information of the at least one working vehicle, which are received from the vehicle communicator of the at least one working vehicle. The mobile terminal may be configured or programmed, in the first mode, to obtain from the server, and display on the terminal interface, the plurality of pieces of attachment information and position information linked with each one of the plurality of pieces of attachment information, which are stored in the vehicle storage of the at least one working vehicle.

The mobile terminal may be configured or programmed, in the first mode, to display on the terminal interface, the plurality of pieces of attachment information and position information linked with each one of the plurality of pieces of attachment information, which are stored in the vehicle storage of the at least one working vehicle, and the plurality of pieces of attachment information, which are stored in the tag memories of the plurality of communication tags which transmit the wireless signals.

The mobile terminal may be configured or programmed to allow an operator to set a position area of the at least one working vehicle, extract at least one of the plurality of pieces of attachment information from the server, based on the set position area and position information of the at least one working vehicle, and display at least one of the plurality of pieces of attachment information on the terminal interface.

The mobile terminal may be configured or programmed to display a map and at least one mark indicating the vehicle position of the at least one working vehicle on the map based on position information thereof, and allow the operator to set the position area of the at least one working vehicle on the map.

The attachment management system may further comprises a server to communicate with a terminal communicator of the mobile terminal, the server including a server storage to store a plurality of pieces of attachment information of the plurality of attachments. The at least one working vehicle may include a plurality of working vehicles, the mobile terminal includes a terminal transceiver, each of the plurality of working vehicles includes a positioning device providing a position information indicating a vehicle position thereof, a vehicle storage to store the plurality of pieces of attachment information of the plurality of attachments, and a vehicle communicator to communicate with the server, and transmits to the server, the plurality of pieces of attachment information linked with position information of each of the plurality of working vehicles. The server storage may store the plurality of pieces of attachment information linked with position information of each of the plurality of working vehicles, which are received from each of the vehicle communicators of the plurality of working vehicles. The mobile terminal may display the plurality of pieces of attachment information linked with position information of each of the plurality of working vehicles, which are stored in the server storage. The mobile terminal may be configured or programmed to, in the second mode, allow an operator to select one of the plurality of pieces of attachment information displayed on the terminal interface, and transmit one of the plurality of pieces of attachment information selected by the operator, from the terminal transceiver to the tag transceiver of one of the plurality of communication tags, to cause the tag memory thereof to store the selected one of the plurality of pieces of attachment information.

The mobile terminal may be configured or programmed to allow an operator to set a position area of the plurality of working vehicles, extract at least one of the plurality of pieces of attachment information from the server storage, based on the set position area and position information of the plurality of working vehicles, and display the plurality of pieces of attachment information on the terminal interface.

The mobile terminal may be configured or programmed to display a map and marks indicating the vehicle positions of the plurality of working vehicles on the map based on position information thereof, and allow the operator to set the position area of the plurality of working vehicles on the map.

The mobile terminal may have a switch to allow the operator to select either one of the first mode and the second mode.

The mobile terminal may be configured or programmed to, in the first mode, display on the terminal interface, the tag identifiers and attachment information stored in each of the tag memories of the plurality of communication tags which transmit the wireless signals, and in the second mode, display on the terminal interface, the tag identifiers stored in each of the tag memories of the plurality of communication tags which transmit the wireless signals having the RSSIs equal to or greater than a predetermined threshold.

An attachment management system according to further aspect of the present invention comprises a server including a server storage, at least one working vehicle including a vehicle communicator to communicate with the server, a plurality of attachments detachably coupled to the at least one working vehicle, a mobile terminal including a terminal communicator to communicate with the server, a terminal transceiver, and a terminal interface, and a plurality of communication tags, each of which is fixed to one of the plurality of attachments, and communicates with the mobile terminal through a wireless signal that is compliant with a near field communication standard. The server storage stores a plurality of pieces of attachment information of the plurality of attachments. Each of the plurality of communication tags includes a tag memory to store a tag identifier unique to each of the plurality of communication tags, and a tag transceiver capable of transmitting the wireless signal containing the tag identifier to the mobile terminal, and receiving from the mobile terminal, attachment information unique to one of the plurality of attachments, on which each of the plurality of communication tags is fixed. The mobile terminal is configured or programmed to obtain and display on the terminal interface, the plurality of pieces of attachment information of the plurality of attachments, by communicating with the server through the terminal communicator, allow an operator to select one of the plurality of pieces of attachment information displayed on the terminal interface, and transmit one of the plurality of pieces of attachment information displayed on the terminal interface and selected by the operator, from the terminal transceiver to the tag transceiver of one of the plurality of communication tags, to cause the tag memory thereof to store the selected one of the plurality of pieces of attachment information.

The at least one working vehicle may include a positioning device providing position information indicating a vehicle position thereof, and a vehicle storage to store the plurality of pieces of attachment information of the plurality of attachments, the vehicle communicator transmits to the server, the plurality of pieces of attachment information of the plurality of attachments, which are linked with position information of the at least one working vehicle, the vehicle communicator transmits to the server, the plurality of pieces of attachment information of the plurality of attachments, which are linked with position information of the at least one working vehicle. The sever storage may store the plurality of pieces of attachment information of the plurality of attachments, which are linked with position information of the at least one working vehicle. The mobile terminal may be configured or programmed to, obtain and display on the terminal interface, the plurality of pieces of attachment information of the plurality of attachments stored in the sever storage, which are linked with position information of the at least one working vehicle, by communicating with the server through the terminal communicator, allow an operator to select one of the plurality of pieces of attachment information displayed on the terminal interface, based on position information of the at least one working vehicle, and transmit the selected one of the plurality of pieces of attachment information, from the terminal transceiver to one of the plurality of communication tags, to cause the tag memory thereof to store the selected one of the plurality of pieces of attachment information.

The at least one working vehicle may include a plurality of working vehicles, and one of the plurality of working vehicles may be located away from another of the plurality of working vehicles.

The mobile terminal may be configured or programmed to, allow the operator to set a position area of the at least one working vehicle, extract at least one of the plurality of pieces of attachment information from the server storage, based on the set position area and position information of the at least one working vehicle, and display the at least one of the plurality of pieces of attachment information on the terminal interface.

An attachment management system according to even further aspect of the present invention comprising a server including a server storage, at least one working vehicle including a vehicle communicator to communicate with the server, a plurality of attachments each detachably coupled to the at least one working vehicle, a mobile terminal including a terminal communicator to communicate with the server, a terminal transceiver, and a terminal interface, and a plurality of communication tags, each of which is fixed to one of the plurality of attachments, and communicates with the mobile terminal through a wireless signal that is compliant with a near field communication standard. The server storage stores a plurality of pieces of attachment information containing a plurality of attachment identifiers unique to each one of the plurality of attachments. Each of the plurality of communication tags includes a tag memory to store a tag identifier unique to each of the plurality of communication tags, and a tag transceiver capable of transmitting the wireless signal containing the tag identifier to the mobile terminal, and receiving from the mobile terminal, attachment information unique to one of the plurality of attachments, on which each of the plurality of communication tags is fixed. The mobile terminal is configured or programmed to, obtain one of the plurality of attachment identifiers of the plurality of pieces of attachment information through operation of an operator, obtain one of the plurality of pieces of attachment information linked with the obtained one of the plurality of attachment identifiers, based on the obtained one of the plurality of attachment identifiers, from the server storage by communicating with the server through the terminal communicator, and transmit the wireless signal containing the obtained one of the plurality of pieces of attachment information, from the terminal transceiver to the tag transceiver of one of the plurality of communication tags, to cause the tag memory thereof to store the obtained one of the plurality of pieces of attachment information.

The mobile terminal may be configured or programmed to, display on the terminal interface, at least one of the plurality of pieces of attachment information stored in the tag memory of at least one of the plurality of communication tags from which the mobile terminal receives the wireless signals having the RSSIs (Received Signal Strength Indicator) equal to or greater than a predetermined threshold, allow the operator to select one of the plurality of attachment identifiers displayed on the terminal interface, and obtain one of the plurality of pieces of attachment information linked with the selected one of the plurality of attachment identifiers, based on the selected one of the plurality of attachment identifiers, from the server storage, by communicating with the server through the terminal communicator.

The mobile terminal may be configured or programmed to obtain one of the plurality of attachment identifiers through input operation of the operator.

The mobile terminal includes a camera. At least one of the plurality of attachments may include an image code recording attachment information. The mobile terminal may be configured or programmed to obtain one of the plurality of attachment identifiers by scanning the image code with the camera.

The at least one working vehicle may include a positioning device providing position information indicating a vehicle position thereof, and a vehicle storage to store the plurality of pieces of attachment information of the plurality of attachments, the vehicle communicator transmits to the server, the plurality of pieces of attachment information of the plurality of attachments, which are linked with position information of the at least one working vehicle, the sever storage stores the plurality of pieces of attachment information of the plurality of attachments, which are linked with position information of the at least one working vehicle. The mobile terminal may be configured or programmed to, obtain and display on the terminal interface, the plurality of pieces of attachment information of the plurality of attachments, which are linked with position information of the at least one working vehicle, by communicating with the server through the terminal communicator, allow an operator to select one of the plurality of pieces of attachment information displayed on the terminal interface, based on position information of the at least one working vehicle, and transmit the selected one of the plurality of pieces of attachment information, from the terminal transceiver to the tag transceiver of one of the plurality of communication tags, to cause the tag memory thereof to store the selected one of the plurality of pieces of attachment information.

The at least one working vehicle may include a plurality of working vehicles, and one of the plurality of working vehicles may be located away from another of the plurality of working vehicles.

The mobile terminal maybe configured or programmed to, allow the operator to set a position area of the at least one working vehicle, extract at least one of the plurality of pieces of attachment information from the server storage, based on the position area and position information of the at least one working vehicle, and display the at least one of the plurality of pieces of attachment information on the terminal interface.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 5 is a mode selection screen displayed on a touch panel of a mobile terminal after activating an app of the attachment management system.

FIG. 6 is a tag detection screen displayed on the touch panel when a tag detection mode is selected.

FIG. 7 is a tag setting screen displayed on the touch panel when a tag setting mode is selected.

FIG. 9 is an input completion screen displayed on the touch panel after the operator has completed inputting a particular attachment information on the tag attachment input information screen of FIG. 8.

FIG. 11A is a list screen displayed on the touch panel, listing a plurality of pieces of attachment information of a plurality of attachments, and a plurality of pieces of position information of a plurality of working vehicles stored in a server storage of the server, each of the plurality of pieces of attachment information is linked to respective one of the plurality of pieces of position information.

FIG. 12 is an area-limited list screen, listing the plurality of pieces of attachment information after the operator selects a particular area of position information on the list screen of FIG. 11A.

FIG. 13 is a type-limited list screen, listing the plurality of pieces of attachment information after the operator selects a particular type of the attachments.

FIG. 14 is a hybrid tag detection screen displayed on the touch panel, listing the plurality of tag IDs and pieces of attachment information stored in the server storage, and the plurality of tag IDs and pieces of attachment information in the beacon signals received from a plurality of beacon tags.

DETAILED DESCRIPTION OF THE EXAMPLE EMBODIMENTS

Figure 1:
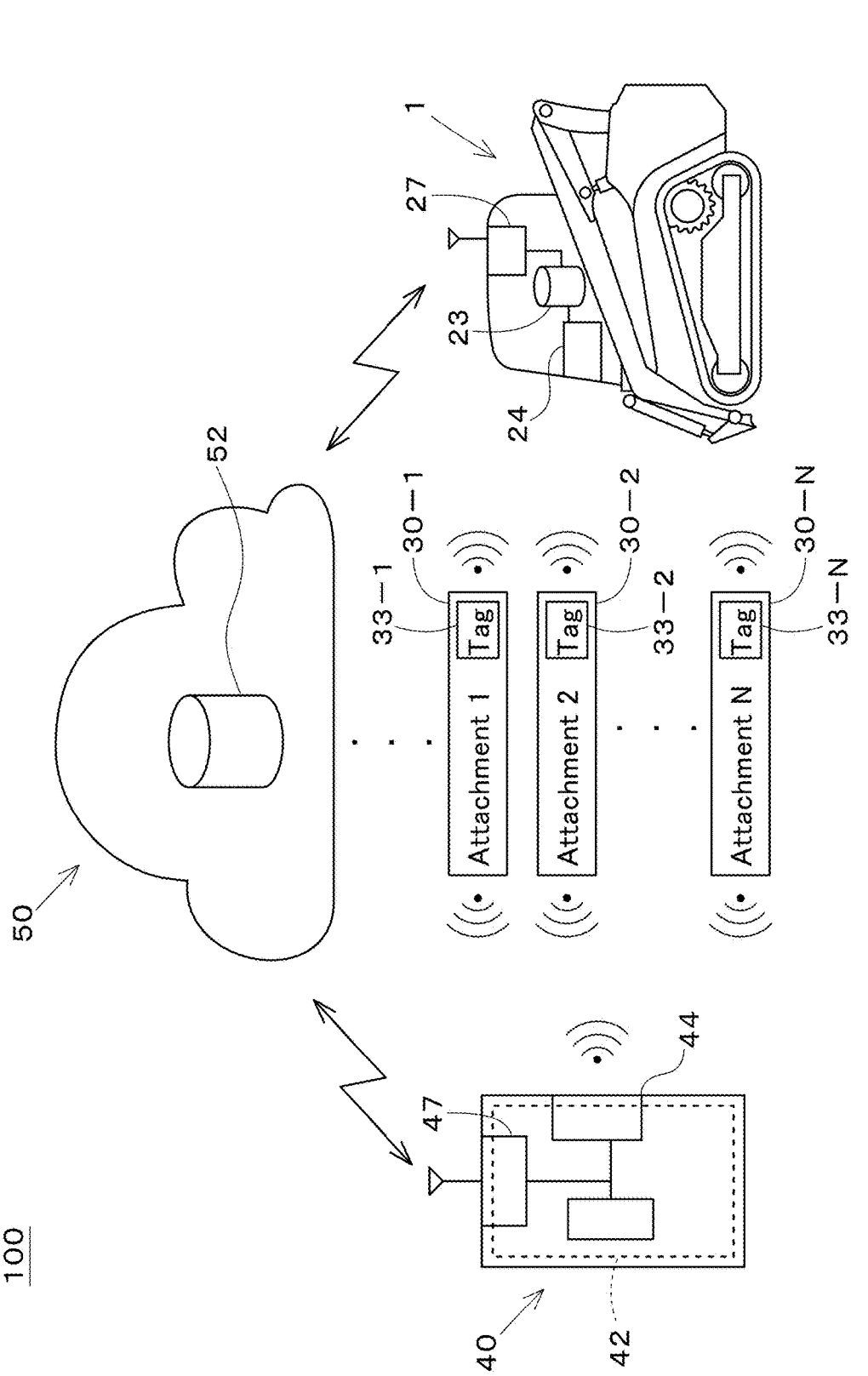
FIG. 1 is a conceptual view of an attachment management system according to an example embodiment of the present invention.

Example embodiments will now be described with reference to the accompanying drawings, wherein like reference numerals designate corresponding or identical elements throughout the various drawings. The drawings are to be viewed in an orientation in which the reference numerals are viewed correctly.

FIG. 1 is a conceptual view of an attachment management system 100, showing an overall structure thereof, according to an example embodiment of the present invention. As shown in FIG. 1, the attachment management system 100 generally includes a working vehicle 1, a plurality of attachments 30 (30-1, . . . , 30-N), a mobile terminal 40, and a server 50. Each of the plurality of attachments 30 (30-1, . . . , 30-N) is configured to be detachably coupled to the working vehicle 1. FIG. 1 illustrates the working vehicle 1 with the attachment 30 detached.

Figure 2:
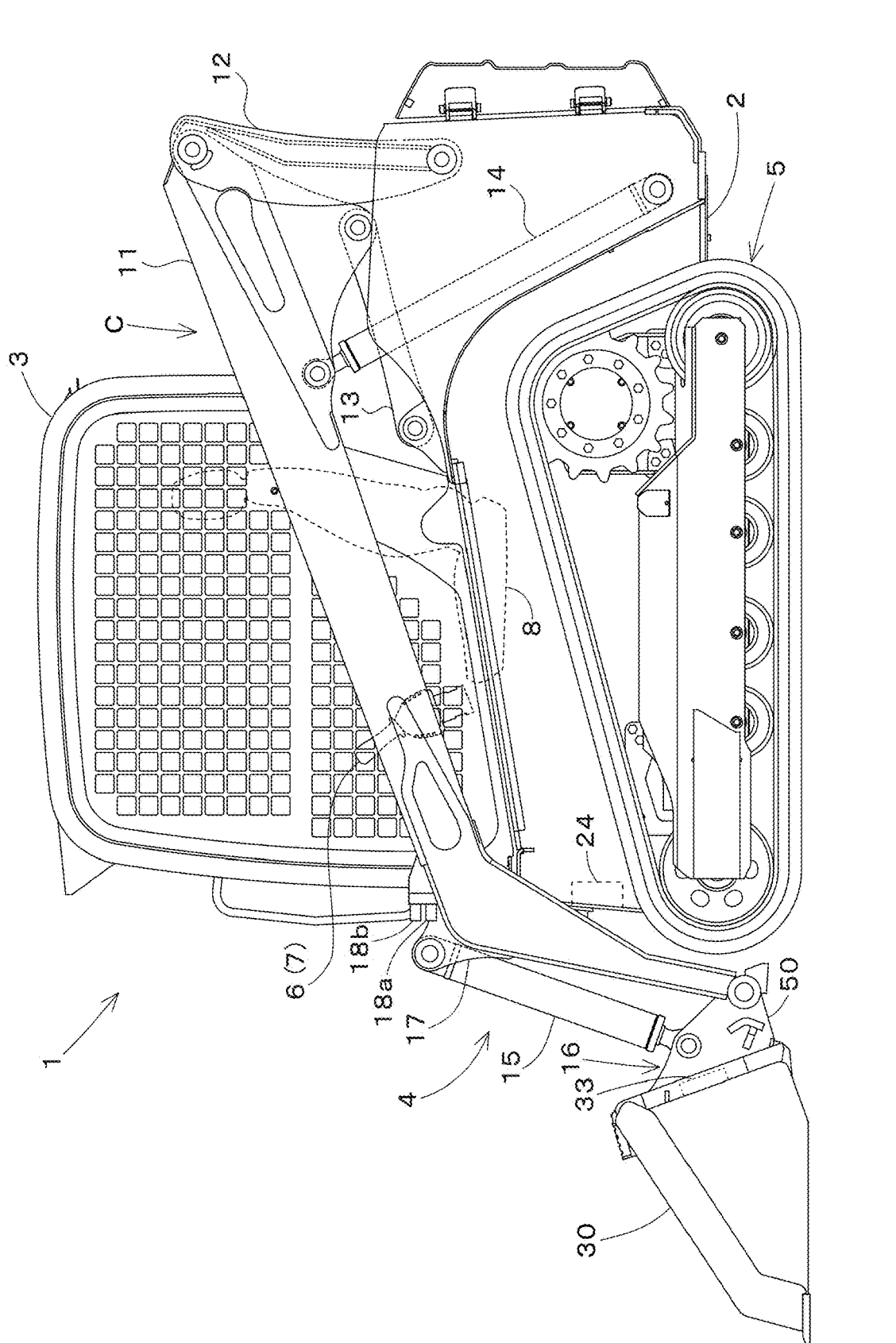
FIG. 2 is a side view of a working vehicle, illustrating various components thereof.

FIG. 2 is a side view of the working vehicle 1 shown in FIG. 1 with the attachment 30 attached, illustrating detailed structures of components thereof. In the present example embodiment, a compact track loader is discussed as an example of the working vehicle 1. Note, however, that the working vehicle according to the example embodiment of the present invention is not limited to a compact track loader, and may be, for example, some other construction machine such as a skid-steer loader and a backhoe (or an excavator), or an agricultural machine such as a tractor.

The working vehicle 1 includes a machine body 2, a cabin 3, a working device 4 (including an attachment 30), and traveling devices 5. The cabin 3 is provided on the machine body 2. The attachment 30 shown in FIG. 2 is a bucket.

The cabin 3 includes an operator's seat 8, operation members (manual operators) to be operated by an operator seated on the operator's seat 8, and/or the like. The operation members include a travel operation member 6 to operate the traveling devices 5 and a work operation member 7 to operate the working device 4.

The traveling devices 5 are provided on the left and right sides of the machine body 2 and support the machine body 2 such that the machine body 2 is allowed to travel. The traveling devices 5 are crawler-based traveling devices. The operator operates the travel operation member 6 to cause both the left and right traveling devices 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the machine body 2 (working vehicle 1) to travel forward, rearward, or turn left or right. Note that the traveling devices 5 may be tire-based traveling devices.

The working device 4 is attached to the machine body 2. The working device 4 includes an attachment 30, a coupling device 16, and a position changing device C. The attachment 30 is a working tool such as a bucket, which can be attached to or detached from the coupling device 16. The attachment may be any other working tools, including, for example, earth augers, angle blooms, crushers, grapples, cold planers, sweepers, skid cutters, skid graders, stamp grinders, snow blowers, snow pushers, spreaders, and dozer blades, trenchers, breakers, pallet forks, hopper blooms, mowers, rippers, loader booms, and rotary tillers. Those attachments 30 include various different specifications such as operations to be performed, structures, sizes, and shapes.

The coupling device 16 is a device provided on the position changing device C, such that the attachment 30 can be attached to or detached from the machine body 2. Thus, the position changing device C is a device configured to change a position of the coupling device 16 relative to the machine body 2. The position changing device C has one end or rear end connected to the machine body 2, and the other end or front end provided with the coupling device 16. The position changing device C moves up and down the coupling device 16 to change a position of the coupling device 16 relative to the machine body 2, which in turn moves up and down the attachment 30 relative to the machine body 2.

In the present embodiment, the position changing device C includes booms 11, lift links 12, control links 13, boom cylinders 14, front cylinders 15, which are provided left and right sides of the cabin 3. The left and right booms 11 are connected to each other by a connector 17 at an intermediate portion of the booms 11. The left boom 11 has, at the front portion thereof, a hydraulic fluid outlet port (power output port) 18a and a hydraulic fluid inlet port 18b.

The lift links 12 and the control links 13 support proximal portions (rear portions) of the booms 11 via shafts such that the booms 11 are swingable up and down. The boom cylinders 14 each have one end thereof pivotally connected to a corresponding one of the booms 11 via a shaft and the other end thereof pivotally connected to a lower rear portion of the machine body 2 via a shaft. Upon operation of the work operation member 7 along a first direction by the operator of the working vehicle 1, the boom cylinders 14 extend or retract and the booms 11 ascend or descend (swing upward or downward).

Note, however, that the above structure of the position changing device C is not limited thereto, and may include arms and booms and/or the like when the working vehicle is a backhoe, and may be an elevator such as a three-point linkage mechanism, when the working vehicle is a tractor.

The coupling device 16 may be a quick hitch capable of coupling the attachment 30 to the machine body 2, or decoupling the attachment 30 from the machine body 2. The booms 11 are provided with the quick hitch 16 at the distal ends thereof. The quick hitch 16 is a linkage configured to easily attach and detach any of various attachments (hydraulic driven working tools) 30 such as the bucket. The operator of the working vehicle 1 can easily change attachments 30 using the quick hitch 16. The quick hitch 16 is therefore also called "quick changer". In the example shown in FIG. 2, the bucket 30 which is an example of the attachment 30 is attached to a front portion of the quick hitch 16.

The quick hitch 16 has, connected to a rear portion thereof, the distal ends of the booms 11 and ends of the front cylinders 15 via respective shafts such that the booms 11 and the front cylinders 15 are pivotable. The opposite ends of the front cylinders 15 are pivotally connected to the connector 17 via shafts. Upon operation of the work operation member 7, the front cylinders 15 extend or retract and the quick hitch 16 swings upward or rearward. With this, the bucket 30 attached to the quick hitch 16, swinging upward or downward, performs shoveling or dumping.

Each of the attachments 30 includes a communication tag 33 (referred to also as a "beacon tag 33" herein) fixed thereon. Specifically, the beacon tag 33 is fixed on the back portion of the attachment 30 by means of any appropriate fixing members such as bolts and nuts. Thus, the beacon tag 33 are interchangeably fixed on each of the attachments 30. For example, in cases where the beacon tag 33 fails or malfunctions, and the battery inside the beacon tag 33 is exhausted and need to be exchanged, a new beacon tag 33 can be fixed on the attachment 30 instead of old one. One beacon tag 33 which has been fixed on one attachment 30 can be replaced and fixed on another attachment 30. Note that International Application Publication WO 2024/081645 A1 entitled as "Work Machine with Wireless Transceiver" discloses a communication tag fixed on the back portion of the attachment, of which content is incorporated herein by reference in their entirety.

Figure 3:
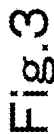
FIG. 3 is a block diagram, illustrating structural features of the attachment management system shown in FIG. 1.

FIG. 3 is a block diagram illustrating schematic structures of the working vehicle 1, a plurality of attachment each having beacon tags 33, and the mobile terminal 40 of the attachment management system of FIG. 1. Each of beacon tags 33 can be interchangeably fixed on the attachment 30, for example due to failure thereof or due to operation to be performed by the attachment 30 fixed thereon.

Each of the beacon tags 33, actually fixed on or to be fixed on the attachment 30, includes a tag transceiver 34 which is configured to periodically transmit and receive a wireless signal (referred to as a "beacon signal" herein) compliant with a near field communication standard such as RFID (Radio Frequency Identification) and BLE (Bluetooth (registered trademark) Low Energy). Each of the beacon tags 33 also includes a tag memory 32 to store a tag identifier unique thereto (referred to simply as a "tag ID" herein), and a microcomputer 31 to control the tag transceiver 34 and the tag memory 32, and a battery 36 to supply power to those components of the beacon tag 33.

Figure 4:
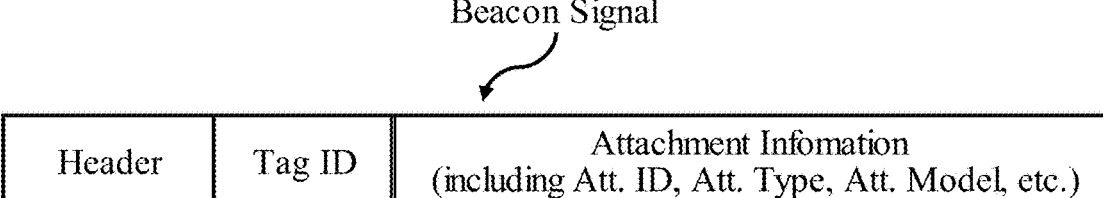
FIG. 4 is a conceptual view illustrating exemplary data contained in a beacon signal which is transmitted from and received by a beacon tag.

FIG. 4 is a conceptual view illustrating exemplary data contained in a beacon signal which is transmitted from and received by a beacon tag 33. The beacon signal contains a header, a tag ID (or a tag serial number), attachment information. Attachment information includes an attachment identifier unique to the attachment 30, on which the beacon tag 33 is fixed. Besides, attachment information includes a name, a type, a model number, a specification of the attachment 30, and/or the like. Since the beacon signal transmitted from the beacon tag 33 is a signal containing its own tag ID but no data to identify the receiver, the beacon signal is called as a broadcasting signal. Note that a newly purchased beacon tag 33 can be interchangeably fixed to one of the attachments 30 so that the beacon signal transmitted therefrom contains its tag ID only and no other attachment information associated with the attachment 30.

Therefore, after the beacon tag 33 is newly purchased, the operator is required through the mobile terminal 40, to set or store attachment information unique to the attachment 30, to which the beacon tag 33 is to be fixed, in the tag memory 32 as an initial setting. Attachment information may contain an attachment identifier (an attachment ID) unique to the attachment 30, and in addition, various information about a name, a type (Att. Type), a model number (Att. Model), a size and/or shape, a specification (Att. Spec.) such as the maximum permissible flow rate of hydraulic fluid to be supplied, a state of charge (SOC) of the battery 36, a cumulative operating time (e.g., hour meter), and/or the like of the attachment 30.

The beacon tag 33 transmits the beacon signal containing the tag ID unique to the beacon tag 33 which is stored in the tag memory 32. The mobile terminal 40 obtains attachment information containing the attachment ID unique to the attachment 30. Then, the mobile terminal 40 transmits the beacon signal containing the particular tag ID and the attachment ID. Thus, the beacon signal transmitted from the mobile terminal 40 contains the header, the tag ID (or a tag serial number), and attachment information obtained based on the attachment ID. The beacon tag 33 stores attachment information in the beacon signal, when receiving the beacon signal containing its own tag ID. In other words, the mobile terminal 40 has a function performing as a reader/writer on the tag memory 33.

On the other hand, the beacon tag 33, of which tag memory 32 has already stored attachment information (when it is ready to be used), transmits (or broadcasts) the beacon signal containing the tag ID and attachment information. A beacon scanner 24 of the working vehicle 1 receives and reads the beacon signal containing the tag ID and attachment information, so that a vehicle controller 21 of the working vehicle 1 recognizes when and which attachment 30 is coupled with the coupling device 16.

The vehicle controller 21 is configured to control the attachment 30 based on recognized attachment information in the received beacon signal. For example, the vehicle controller 21 may be configured to control output of hydraulic fluid (power) to the attachment 30 coupled with the coupling device 16, based on recognized attachment information. In this case, the vehicle controller 21 controls at least either one of input of hydraulic fluid from the attachment 30, and output amount and output pressure of hydraulic fluid supplied to the attachment 30. In addition, the vehicle controller 21 may be configured to control a vehicle interface 25 to provide or display information that the attachment 30 is coupled with the coupling device 16 (or the working vehicle 1).

While the above description discusses about the case where the initial setting is required for the newly purchased beacon tag 33, attachment information may have already been stored in the tag memory 32 of the beacon tag 33 in a case where the beacon tag 33 is sold with attachment information of the attachment 30 linked with the beacon ID of the beacon tag 33.

In particular, the microcomputer 31 of the beacon tag 33 is configured to control the tag transceiver 34 to transmit the beacon signal containing the beacon ID and attachment information stored in the tag memory 32, in a predetermined time period of one to three seconds, for example. When receiving the beacon signal, the microcomputer 31 of the beacon tag 33 is configured to determine whether the beacon signal contains its own tag ID, and if it does, the microcomputer 31 is configured to cause the tag memory 32 to store attachment information in the beacon signal or overwrite attachment information with one in the beacon signal.

The mobile terminal 40 typically includes a terminal device such as a smartphone and a tablet computer, and may be a mobile laptop PC (Personal Computer), and even a standalone terminal device, which is not limited thereto. The mobile terminal 40 includes a terminal communicator 47 capable of communicating with a server (including a cloud server) via the Internet and wireless LAN (Local Area Network). The mobile terminal 40 includes a terminal interface 42 (which may be referred to simply as a "touch panel 42" herein) to allow the operator to input/output information (displaying or providing information). The mobile terminal 40 also includes a terminal transceiver 44 to receive the beacon signals from a plurality of beacon tags 33 and transmit the beacon signal having selected one of tag IDs to the beacon tag 33.

The terminal interface 42 is embodied by the touch panel of the smartphone. The mobile terminal 40 may include a camera 46 implemented by CCD (Charge Coupled Devices) or CMOS (Complementary Metal Oxide Semiconductor) image sensors. The mobile terminal 40 includes a terminal controller 41 configured to control the terminal communicator 47, the terminal transceiver 44, and the camera 46.

The mobile terminal 40 includes a terminal controller 41 which is processing circuitry having one or more processors such as CPU (Central Processing Unit), DPU (Digital Signal Processor), FPGA (Field Programmable Gate Array) and ASIC (Application Specific Integrated Circuit).

As described above, the attachment management system 100 includes a working vehicle 1, a plurality of attachments 30 (30-1, . . . , 30-N) each detachably coupled to the working vehicle 1, a mobile terminal 40 having a terminal interface 42 (touch panel 42), and a plurality of communication tags 33, each of which is interchangeably fixed to one of the plurality of attachments 30, and communicates with the mobile terminal 40 through the beacon signal that is compliant with a near field communication standard.

The working vehicle 1 includes a beacon scanner 24 to receive the beacon signals from the plurality of communication tags 33, and a vehicle communicator 27 to communicate with the server (cloud server) via the Internet and wireless LAN. The working vehicle 1 also includes a vehicle storage 23, a vehicle interface 25 to allow the operator to input/output information (displaying or providing information), and a vehicle controller 21 to control the above-described components. Furthermore, the working vehicle 1 may include a positioning device 26 to identify its own position of the working vehicle 1.

In particular, the vehicle controller 21 is processing circuitry having one or more processors. The vehicle controller 21 is configured to communicate with the vehicle communicator 27, the beacon scanner 24, the vehicle storage 23, the vehicle interface 25, the positioning device 26, other various on-board devices on the working vehicle 1, via an in-vehicle network such as CAN, ISOBUS, LIN and, FlexRay, and control those devices to achieve various controls of the working vehicle 1.

The vehicle controller 21 includes one or more memories, and a variety of analog and digital circuits. The one or more memories store (memorize) software programs and various data to cause the one or more processors to perform functions. In particular, the one or more memories of the vehicle controller 21 includes an internal memory 22 which is formed of a volatile or non-volatile memory. The vehicle controller 21 uses a predetermined memory region of the non-volatile memory, as a buffer memory for temporarily memorizing information.

The vehicle controller 21 is connected to the vehicle storage 23 (non-volatile memory) for communication therebetween, which is provided outside the vehicle controller 21. The internal memory 22 and the vehicle storage 23 store several software programs and various control data for controlling operation of each of the devices of the working vehicle 1. The vehicle storage 23 stores a plurality of pieces of attachment information corresponding to the plurality of attachments 30.

The vehicle controller 21 is connected to read software programs and control data using one or more processors, enabling it to perform various operations based on these inputs. Additionally, the vehicle controller 21 can execute operations based on predetermined logic circuitry implemented within the processors.

Similar to the terminal controller 41 of the mobile terminal 40, the processors implementing the vehicle controller 21 include CPU (Central Processing Unit), DPU (Digital Signal Processor), FPGA (Field Programmable Gate Array), and ASIC (Application Specific Integrated Circuit).

The vehicle controller 21 is capable of performing various operations in coordination with multiple physically separate processors. Moreover, the structure of the vehicle controller 21 is not limited to these components. For example, these processors could be mounted on physically separate computers and interconnected via networks such as an in-vehicle network, LAN, WAN, Internet, and/or the like.

The positioning device 26 is equipped with a GNSS (Global Navigation Satellite System) receiver. The GNSS receiver includes processing circuitry that determine the position of the work vehicle 1 based on signals from GNSS satellites. The positioning device 26 determines its own current position (e.g., latitude and longitude) based on GNSS signals transmitted from GNSS satellites. GNSS refers to a collective term for satellite positioning devices such as GPS (e.g., Michibiki), QZSS, GLONASS, Galileo, and BeiDou. Additionally, while the positioning device 26 determines the position (current position) of the working vehicle 1 using a GNSS receiver, it may also detect the current position by other means. For example, sensing devices such as LiDAR may be provided on the vehicle body 2, and the positioning device 26 may estimate (determine) the current position based on the results sensed by the sensing devices and map information (environmental map information) stored in the vehicle storage 23.

The server 50 includes a server storage 52, which can store a plurality of pieces of attachment information of various attachments 30 as well as the vehicle storage 23.

The terminal transceiver 44 of the mobile terminal 40 and the beacon scanner 24 of the working vehicle 1 can detect the received signal strength (which may be referred to simply as "RSSI", Received Signal Strength Indicator) of the beacon signal. The terminal interface 42 of the mobile terminal 40 and the vehicle interface 25 can both display the RSSI of the received beacon signal. While the beacon scanner 24 is described herein as a device to receive the beacon signal from the beacon tag 33, it should be noted that the device may also transmit the beacon signal such that it may be structured as a vehicle transceiver.

Next, with reference to FIGS. 5-14, an example embodiment and variations of a process or a series of steps performed by the components of the attachment management system 100 will be described hereinafter. When the operator activates an app of the attachment management system 100 on an initial screen of the mobile terminal 40, the mobile terminal 40 displays a mode selection screen M1 as shown in FIG. 5, on the touch panel 42 (termina interface 42). Hereinafter, the owner of the mobile terminal 40, the operator (driver) of the working vehicle 1, the manager of the company that owns the working vehicle 1 and/or the attachments 30, and the manager of the barn (garage) or rental company for the attachments 30 will collectively be referred to as the "operator".

The operator can select either one of a tag detection mode 48 (which is also referred to as a "first mode" herein) and a tag setting mode 49 (which is also referred to as a "second mode" herein) on the mode selection screen M1 as shown in FIG. 5. Hence, the mobile terminal 40 has the switches 48 and 49 (including GUI switches) on the mode selection screen M1 of FIG. 5. It should be noted that these switches 48 and 49 are not limited to GUI switches, and they may be physical switches on the mobile terminal 40.

With a plurality of attachments 30 arranged around the mobile terminal 40, the mobile controller 41 is configured to control the touch panel 42 to display a tag detection screen M2 as shown in FIG. 6, when the operator taps an area indicating the "tag detection mode" on the touch panel 42 to select the "tag detection mode". Hereinafter, selecting a particular position/area on the touch panel 42 is referred to as "tapping" on the ouch panel 42.

The mobile transceiver 44 of the mobile terminal 40 receives a plurality of beacon signals from a plurality of tag transceivers 34 of the beacon tags 33 fixed on respective one of the plurality of attachments 30 around the mobile terminal 40. Each of the beacon signals from the beacon tags 33 contains a tag identifier (tag ID) different from one another. The mobile transceiver 44 of the mobile terminal 40 also receives the beacon signals each containing different tag identifies when one or more of the beacon tags 33 around the mobile terminal 40 regardless whether they have not yet used or fixed on respective one of the attachments 30. The mobile transceiver 44 detects RSSIs (Received Signal Strength Indicators) of each of the received beacon signals.

FIG. 6 shows a tag detection screen M2 displayed on the touch panel 42 when the mobile transceiver 44 receives the plurality of beacon signals in the tag detection mode. In particular, the tag detection screen M2 of FIG. 6 lists a plurality of tag IDs and RSSIs, and the plurality of pieces of attachment information each including attachment ID (Att. ID), attachment type (Att. type), and attachment model (Att. model), which are contained in each of the beacon signals having a relative value of the RSSIs equal to or greater than a first threshold (e.g., 3). In the tag detection mode, the touch panel 42 displays one or more of tag IDs and pieces of attachment information in the beacon signals only with the RSSIs equal to or greater than the first threshold. As the relative value of the RSSIs is greater, the beacon signal has greater signal strength. It should be noted that attachment information other than the attachment ID is not limited to attachment type and attachment model.

More preferably, both in the tag detection mode and the tag setting mode, the mobile terminal 40 sorts and display the plurality of pieces of attachment information on the terminal interface (touch panel) 42 based on the RSSIs of the beacon signals received from the plurality of beacon tags 33. In particular, the mobile controller 41 is configured to control the touch panel 42 to display the plurality of pieces of attachment information sorted in a descending order based on the relative values of the RSSIs of the beacon signals, as shown in the tag detection screen M2 of FIG. 6.

That is, the mobile controller 41 is configured to control the touch panel 42 so that the plurality of pieces of attachment information in the beacon signals having greater RSSI is displayed at higher positions on the touch panel 42.

In the tag detection mode (first mode), while the plurality of pieces of attachment information in the beacon signals having the RSSIs in a range between 0-10 are displayed on the tag detection screen M2 of FIG. 6, the RSSIs may be varied in the other range (e.g., 0-100). A number of lines of attachment information displayed on the touch panel 42 are dependent on the number of the beacon tags 33 around the mobile terminal 40, which is ten of lines in the tag detection screen M2 of FIG. 6, and may be greater or less than 10. The first threshold of the RSSIs of the beacon signals is not limited to 3, and any threshold of the RSSIs can be adapted to display, on the touch panel 42, the plurality of pieces of attachment information in the beacon signals.

In addition, the first threshold of the RSSIs of the beacon signals may be set as zero. That is, the mobile terminal 40 in the tag detection mode may display on the touch panel 42, the plurality of tag IDs and the RSSIs, and the plurality of pieces of attachment information including attachment ID (Att. ID), attachment type (Att. type), and attachment model (Att. model), in the beacon signals received from all beacon tags 33 around the mobile terminal 40.

If the beacon signal includes no attachment information, for example, in a case where the beacon tag 33 is newly purchased and no attachment information has been input so that the tag memory 32 stores no attachment information, then attachment information is not displayed, or a denotation of "N/A" (Not Applicable) is displayed in the tag detection screen M2 as shown in FIG. 6 In the tag detection screen M2 of FIG. 6, the mobile terminal 40 is configured to display no attachment information including attachment ID (Att. ID), attachment type (Att. type), and attachment model (Att. model) for the beacon tags 33 of the third row (Tag ID: T #4051), the fourth row (Tag ID: T #8397), and the nineth row (Tag ID: T #8603) from the top.

In the tag detection mode (first mode), the mobile terminal 40 receives the beacon signals from the plurality of beacon tags 33 (beacon tags 33-1, 33-2, . . . , 33-N), but transmit no beacon signal to any one of the beacon tags 33. In other words, in the tag detection mode, the mobile transceiver 44 of the mobile terminal 40 receives the beacon signals but transmits no beacon signal. The operator can easily recognize location of the beacon tags 33, which have been fixed and not yet fixed on one of the attachments 30, around the mobile terminal 40, simply by looking at the tag detection screen M2 of FIG. 6. Thus, the operator can easily realize location of the beacon tags 33 fixed on one of the attachments 30 arranged in the garage and around the mobile terminal 40, and location of the unused beacon tags 33 around the mobile terminal 40.

As described above, as the beacon signal is the wireless signal compliant with a near field communication standard, the RSSIs of the beacon signal changes in accordance with a distance between the mobile terminal 40 and the beacon tag 33. The operator having the mobile terminal 40 walks around the attachments 30 on which the beacon tags 33 is fixed and/or the unused beacon tags 33, which causes the RSSIs of the beacon signals received by the mobile terminal 40 to substantially be changed. That is, the RSSIs of the beacon signals received by the mobile terminal 40 changes with movement of the mobile terminal 40 (the operator). Therefore, the operator easily and reliably recognize which one of attachments 30 or which one of beacon tags 33 is closest to the mobile terminal 40 (the operator) simply by looking at the list of the beacon IDs and attachment IDs, if any, sorted in the descending order on the tag detection screen M2 of FIG. 6.

FIG. 7 shows a tag setting screen M3 displayed on the touch panel 42 when the mobile transceiver 44 receives the plurality of beacon signals in the tag setting mode. The mobile controller 41 is configured to control the touch panel 42 to display the tag setting screen M3 of FIG. 7, when operator selects the tag setting mode by tapping the "tag setting mode" on the touch panel 42 as shown in the mode selection screen M1 of FIG. 5 or the tag detection screen M2 of FIG. 6.

In the tag setting mode, the touch panel 42 displays one or more of tag IDs in the beacon signals only with the RSSIs equal to or greater than the second threshold (e.g., 6 or greater) that is greater than the first threshold (e.g., 3), as shown in the tag setting screen M3 of FIG. 7. The mobile transceiver 44 of the mobile terminal 40 controls the touch panel 42 to display one or more of tag IDs in the beacon signals with the RSSIs not less than the second threshold as shown in the tag setting screen M3 of FIG. 7.

In the tag setting mode, the touch panel 42 displays one or more of tag IDs in the beacon signals only with no attachment information in the tag memory 32. While the touch panel 42 displays one or more of tag IDs in the beacon signals and "N/A" for no attachment information in the tag detection screen M2 of FIG. 6, the touch panel 42 displays one or more of tag IDs in the beacon signals only with no attachment information in the tag memory 32 in the tag setting screen M3 of FIG. 7. Preferably, the mobile controller 41 is configured to control the touch panel 42 to sort and display one or more of the beacon IDs in the beacon signals in a descending order based on the RSSIs thereof, so that one or more of the beacon IDs in the beacon signals having greater RSSIs are displayed at higher positions on the touch panel 42, similar to the tag detection screen M2 of FIG. 6.

The mobile terminal 40 is configured to not only receives one or more beacon signals from one or more beacon tags 33 but also transmit to at least one beacon tag 33, the beacon signal containing attachment information. That is, in the tag setting mode of the tag setting screen M3, the mobile terminal 40 can receive beacon signals from a plurality of beacon tags 33 and transmit the beacon signal containing the tag ID and attachment information to at least one (or a particular one) beacon tag 33, unlike in the tag detection mode of the tag detection screen M2. With this, the operator can easily recognize location of the beacon tags 33 transmitting the beacon signals having RSSIs greater than a predetermined threshold (the second threshold), which have been fixed and not yet fixed on one of the attachments 30, around the mobile terminal 40, simply by looking at the tag setting screen M3 of FIG. 7.

In addition, the operator can select one of the tag IDs by tapping its portion displayed on the tag setting screen M3 and change (and store/overwrite) attachment information of the selected or corresponding tag ID with another attachment information. Specifically, when the operator taps a portion indicating the tag ID to be selected on the tag setting screen M3 of FIG. 7, the portion of the touch panel 42 is displayed in black and white inversion, or in a different color as shown in an attachment information input screen M31 of FIG. 8, to indicate that the tag ID is selected. The operator may use another typing or popup screen to directly input or write any character strings for attachment information (through input operation of the operator) corresponding to the selected tag ID.

Figure 8:
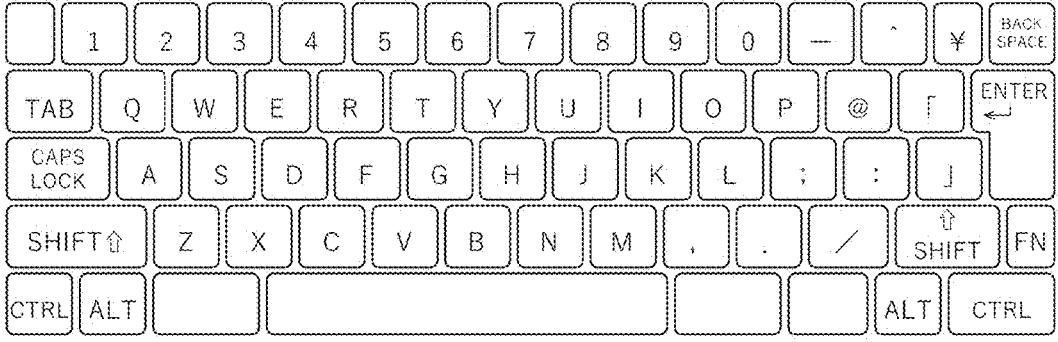
FIG. 8 is an attachment input information screen displayed on the touch panel after an operator selects a particular tag ID on the tag setting screen of FIG. 7.

For example, when the operator taps a portion indicating the tag ID (T #8636), the terminal controller 41 controls the touch panel 42 to display "T #8636" of the selected tag ID in black and white inversion as shown in the attachment information input screen M31 of FIG. 8. The terminal controller 41 further controls the touch panel 42 to display another typing or popup screen to allow the operator to input any numbers or characteristics. With this, the mobile terminal 40 can obtain one of the plurality of pieces of attachment information corresponding to the selected tag ID (T #8636) through the touch panel 42 or manual input operation of the operator.

The terminal controller 41 of the mobile terminal 40 is configured to control the terminal transceiver 44 to transmit the beacon signal containing the selected tag ID (T #8636) and obtained attachment information corresponding thereto. On the other hand, while the tag memory 32 of the beacon tag 33 stores its own tag ID, the microcomputer 31 of the beacon tag 33 is configured to control the store obtained attachment information in the tag memory 32 in the beacon signal when the microcomputer 31 determines that the beacon signal contains its own tag ID (T #8636). This allows the operator to input or rewrite appropriate attachment information with the selected tag ID, in the tag memory 32 of the beacon tag 33 as shown in the input completion screen M32 of FIG. 9 When the beacon tag 33 has an internal circuitry failed or an internal battery completely exhausted, the operator can remove it from the attachment 30, fix a new beacon tag 33 on the attachment 30, and surely input appropriate attachment information in the tag memory 32 of the beacon tag 33. The order of the operator's steps is flexible, such that the operator may input appropriate attachment information in the tag memory 32 of the new beacon tag 33, and then fix a new beacon tag 33 on the attachment 30.

As described above, the mobile terminal 40 including the terminal transceiver 44 is configured to allow the operator to select one of the tag IDs displayed on the terminal interface 42, obtain one of the plurality of pieces of attachment information that the operator inputs through the terminal interface 42, and transmit the beacon signal containing the selected tag ID and obtained attachment information, from the terminal transceiver 44 to the tag transceiver 34, to cause the tag memory 32 of the selected tag ID to store obtained attachment information.

It should be noted that even single piece of attachment information includes various information, for example, attachment type, attachment model number, specification and/or the like, the operator's task to input attachment information would be cumbersome especially in writing or storing attachment information in the tag memory 32 of a new beacon tag 33. Therefore, some variations will be discussed herein, which allow the mobile terminal 40 to obtain attachment information in more readily manners.

[Variation 1] At least one attachment 30 may include an image code (a QR code (Quick Response code, registered trademark) or a bar code) affixed thereon, recording attachment information thereof. After selecting one of tag IDs, the operator may use the camera 46 of the mobile terminal 40 to obtain appropriate attachment information of the attachment 30 by scanning the image code on the attachment 30, instead of manually inputting attachment information on the character input screen. Thus, in the tag setting mode, the mobile terminal 40 can obtain attachment information corresponding to one of the tag IDs selected by the operator, by scanning the image code affixed on the attachments 30 or even the beacon tags 33 with the camera 46.

Then, the mobile terminal 40 transmits the beacon signal containing the beacon signal containing the selected tag ID and attachment information corresponding thereto. When the microcomputer 31 of the beacon tag 33 recognizes that the beacon signal received from the terminal transceiver 44 includes its own tag ID, the microcomputer 31 is configured to cause the tag memory 32 of the beacon tag 33 to store attachment information. With this, the mobile terminal 40 can eliminate the manual input task of the operator through the touch panel 42 to obtain attachment information, simply by scanning the image code with the camera 46.

[Variation 2] As discussed above, the server 50 includes a server storage 52, the vehicle communicator 27 of the working vehicle 1 is capable of communicating with the mobile terminal 40 via the server 50, the Internet and wireless LAN, and/or the like. A plurality of pieces of attachment information (including attachment IDs) stored in the vehicle storage 52 are transferred to the server 50 in a regular basis and stored in the server storage 52. Therefore, the mobile terminal 40 can obtain one of the plurality of pieces of attachment information desired by the operator, among the plurality of pieces of attachment information stored in the server storage 52, as will be discussed in detail hereinafter.

Figure 10:
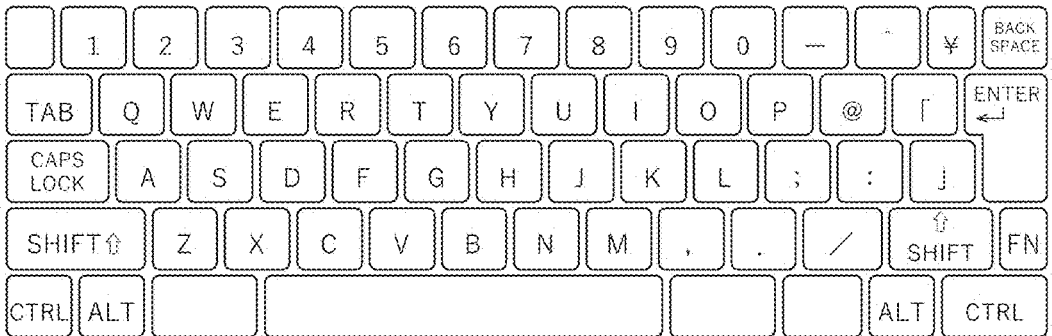
FIG. 10 is another attachment information input screen displayed on the touch panel after the operator selects a particular tag ID and taps a button of "Obtain Attachment Information".

In the tag setting mode, the operator taps the tag ID (T #8636) on the touch panel 42, manually inputs a particular attachment ID (e.g., A #3864) through the character input screen, and taps a button of "Obtain Attachment Information", as shown in the attachment information input screen M4 of FIG. 10.

This activates the mobile terminal 40 to communicates with the server 50 to extract one of the plurality of pieces of attachment information having the attachment ID consistent with the attachment ID (A #3864) input by the operator, among the plurality of pieces of attachment information stored in the server storage 52. More specifically, the mobile terminal 40 transmits a request signal containing the attachment ID (A #3864) input by the operator, from the terminal communicator 47 to the server 50. Upon receipt of the request signal from the mobile terminal 40, the server 50 extracts one of the plurality of pieces of attachment information having the selected or designated attachment ID (A #3864) from the server storage 52, and transmits a response signal containing one of the plurality of pieces of attachment information with the designated or requested attachment ID (A #3864) to the mobile terminal 40. As above, the mobile terminal 40 can readily obtain the attachment ID corresponding to the selected tag ID, and obtain one of the plurality of pieces of attachment information among the plurality of pieces of attachment information stored in the server storage 52, based on the attachment ID, by communicating with the server 50 via the terminal communicator 47.

Furthermore, the mobile terminal 40 transmits the beacon signal containing the tag ID (T #8636) selected by the operator and one of the plurality of pieces of attachment information linked with the attachment ID (A #3864) input or designated by the operator, among the plurality of pieces of attachment information stored in the server storage 52. When the microcomputer 31 of the beacon tag 33 finds its own tag ID (T #8636) in the beacon signal transmitted from the mobile terminal 40, the microcomputer 31 is configured to control the tag memory 32 of the beacon tag 33 to store one of the plurality of pieces of attachment information with the attachment ID (A #3864). With this, the beacon tag 33 can easily obtain from the server storage 52, appropriate attachment information with the attachment ID of the attachment 30, on which the beacon tag 33 is fixed.

As discussed above, the server 50 is capable of communicating with the mobile terminal 40, and includes the server storage 52 to store the plurality of pieces of attachment information having attachment IDs each unique to the attachments 30. On the other hand, the mobile terminal 40 includes the terminal transceiver 44 and the terminal communicator 47, and obtains one of the plurality of piece of attachment information stored in the server storage 52, by communicating with the server 50 via the terminal communicator 47. In the tag setting mode, the mobile terminal 40 is configured to allow the operator to select one of tag IDs among one or more tag IDs displayed on the touch panel 42. The mobile terminal 40 is also configured to obtain one of the plurality of pieces of attachment information, from the server storage 52, which corresponds to the attachment ID input through the touch panel 42, and to transmit the beacon signal containing the selected tag ID and the obtained one of the plurality of pieces of attachment information, from the terminal transceiver 44 to the tag transceiver 34 of the beacon tag 33, to cause tag memory 32 to store the obtained one of the plurality of piece of attachment information.

It should be noted that, as discussed above, the attachment ID (e.g., A #3864) corresponding to the selected tag ID may be obtained by the manual input operation of the operator through the touch panel 42, or by scanning the image code affixed on the attachment 30 with the camera 46 of the mobile terminal 40.

Alternatively, the mobile terminal 40 may be configured to obtain one of the plurality of pieces of attachment information, from the vehicle storage 23 of a local working vehicle 1 positioned away from the mobile terminal 40, instead of the server storage 52, which corresponds to the tag ID selected through the touch panel 42. The working vehicle 1 includes the vehicle communicator 27 capable of communicating with the server 50 via Internet, wireless LAN and/or the like, and the vehicle storage 23 to store the plurality of pieces of attachment information having attachment IDs each unique to respective one of the plurality of attachments 30.

The mobile terminal 40 includes the terminal transceiver 44, and obtains the plurality of pieces of attachment information stored in the vehicle storage 23 of the local working vehicle 1, via the terminal communicator 47, the server 50, and vehicle communicator 27. In the setting mode, the mobile terminal 40 is configured to allow the operator to select one (e.g., T #8636) of the tag IDs displayed on the touch panel 42. The mobile terminal 40 is configured to obtain one of the plurality of pieces of attachment information corresponding to the one of the tag IDs selected by the operator through the touch panel 42, from the vehicle storage 23. The obtained one of the plurality of pieces of attachment information may contain the attachment ID, for example, A #3864. Furthermore, the mobile terminal 40 is configured to transmit the beacon signal containing the selected one of the tag IDs and the obtained one of the plurality of pieces of attachment information, from the terminal transceiver 44 to the tag transceiver 34 of the beacon tag 33, to cause tag memory 32 to store the obtained one of the plurality of piece of attachment information. This eliminates complicated or cumbersome operator's input operation of the plurality of piece of attachment information, and surely causes the tag memory 32 to store appropriate attachment information.

The vehicle storage 23 stores the plurality of pieces of attachment information of the attachments 30 which have been attached to the working vehicle 1 in the past. In particular, each of the plurality of pieces of attachment information of the attachments 30, which has been attached to the working vehicle 1 and controlled by the vehicle controller 21, has been obtained from the beacon signal received by the beacon scanner 24 from the beacon tag 33, and has been stored in the vehicle storage 23. Each of the plurality of pieces of attachment information of the attachments 30 may be uploaded to the sever 50 as appropriate. That is, data of the server storage 52 may be accumulated by updating the plurality of pieces of attachment information to the server 50, in processes while a variety of the attachments 30 have been coupled and used with the working vehicle 1. Preferably, the server storage 52 may store also log data indicating the time when each of the plurality of pieces of attachment information was stored, as attribute information thereof. Similarly, the server storage 52 may store log data indicating the time when each of the plurality of pieces of attachment information was uploaded to the server 50.

When an old beacon tag 33 is removed from the attachment 30 and new beacon tag 33 is fixed onto the same attachment 30, attachment information including usage history data such as hour meter, which has been stored in the vehicle storage 23, may be useful, since the new beacon tag 33 fixed on the attachment 30 has no usage history data. As described in the above embodiment, the mobile terminal 40 can obtain the plurality of pieces of attachment information including usage history data from the server storage 52 or the vehicle storage 23 and store one of attachment information in the tag memory 32 of the new beacon tag 33.

More specifically, after the operator selects one of the tag IDs through the touch panel 42, the mobile terminal 40 may obtain one of the plurality of pieces of attachment information, based on the selected one of the tag IDs, from the server storage 52 or the vehicle storage 23, and display on the touch panel 42, the plurality of pieces of attachment information including usage history data and log data. For example, only in a case where the operator confirms that log data in attachment information indicates that attachment information was stored within a predetermined time period before the current time, the operator may tap the button of "Obtain Attachment Information" shown in the attachment information input screen M4 of FIG. 10, to transmit the beacon signal containing the selected one of attachment information including recent usage history data, from the mobile terminal 40 to the new beacon tag 33.

Alternatively, the mobile terminal 40 may display the button of "Obtain Attachment Information" of FIG. 10 on the touch panel 42, only in a case where log data in attachment information indicates that attachment information was stored within a predetermined time period before the current time, and allow the operator to tap the displayed button of "Obtain Attachment Information" to transmit the beacon signal containing the selected attachment information with recent usage history data. In other words, the terminal controller 41 controls the touch panel 42 not to display the button of "Obtain Attachment Information", in a case where log data in attachment information indicates that attachment information was old and stored before the predetermined time period from the current time. With this, the terminal controller 41 may prohibit transmitting the beacon signal containing the selected attachment information with old usage history data.

[Variation 3] The server 50 according to Variation 3 stores the plurality of pieces of attachment information each linked with position information indicating position or location of each of the working vehicles 1. The server 50 stores the plurality of pieces of attachment information of the attachments 30 which can be attached to each of the working vehicles 1, and position information indicating position or location of each of the working vehicles 1. As described above, each of the working vehicles 1 includes a positioning device 26 to provide position information indicating its own current position. One of the working vehicles 1 may be away from another, or may be in the same area with another.

Each of the working vehicles 1 includes a vehicle ID unique thereto. The server 50 can store the plurality of pieces of attachment information uploaded from the vehicle storages 23, which are each linked with respective one of vehicle IDs of the working vehicles 1. This allows the server 50 to store the vehicle IDs of a plurality of working vehicles 1, the plurality of pieces of position information, and the plurality of pieces of attachment information with attachment IDs of the attachments 30 which have been attached or are to be attached to the working vehicles 1, all of which are linked to one another.

It should be noted that the server storage 52 of the server 50 and the vehicle storage 23 of the working vehicles 1 according to Variation 3 may store the plurality of pieces of attachment information including log data indicating the stored and uploaded time as attribute information thereof, similar to ones according to Variation 2.

Figure 11B:
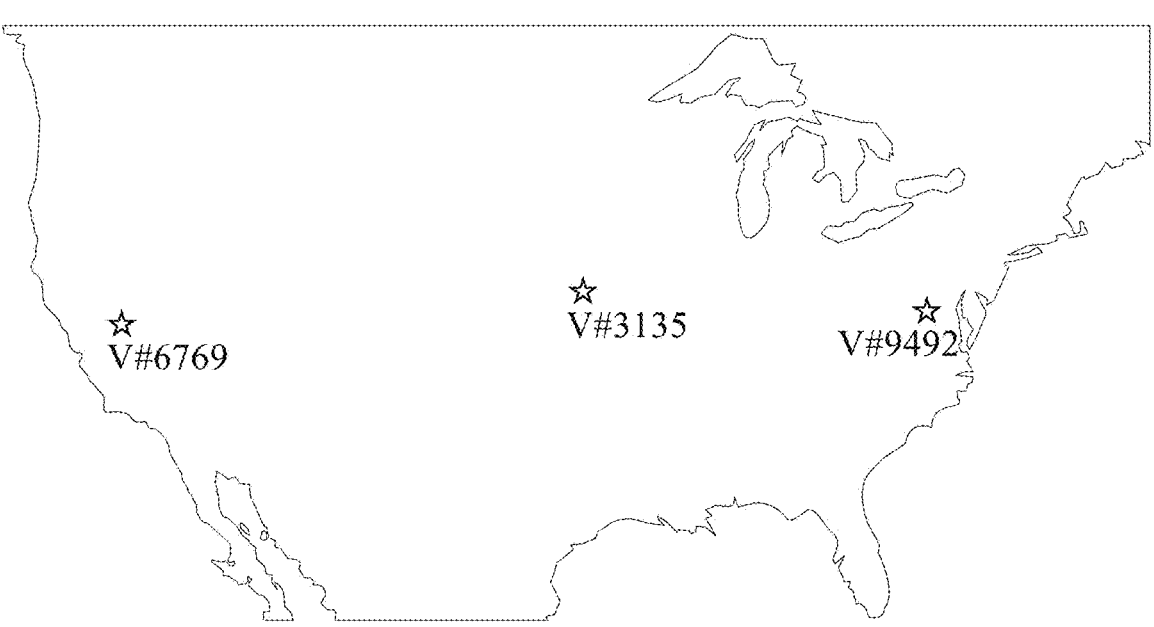
FIG. 11B is a map including a plurality of marks each indicating the plurality of pieces of position information of the working vehicles.

FIG. 11A is a list screen M5 displayed on the touch panel 42 of the mobile terminal 40, indicating a plurality of pieces of attachment information (such as attachment type and model number) with attachment IDs, linked with the vehicle IDs and a plurality of pieces of position information of the working vehicles 1. FIG. 11B is a map of the United States, including multiple marks (star marks) each indicating the positions of the working vehicles 1 based on position information thereof, together with multiple vehicle IDs. The marks may be icons unique to the working vehicle 1 instead of the star marks. Each of the plurality of pieces of position information may be expressed in latitude and longitude, but may be expressed with plus codes of Google Map (registered trademark) or map codes. For convenience, the plus codes of Google Map are used herein for indicating the plurality of pieces of position information of the working vehicles 1. The plus code includes simple character strings and name of city (and state or prefecture) for indicating exact point of the position on Google Map, such as "RCX7+ M3, Salina, KS" and "RW2P+G9, Alexandria, VA", which are open source to freely be available. App of Google Map is used with the plus code entered, the mark corresponding to the plus code is indicated on the map. The mobile terminal 40 may be configured to indicate on the touch panel 42, the marks indicating positions of one or more working vehicles 1 on the map based on position information thereof, and allow the operator to set a position area for one or more working vehicles 1.

When the operator taps a particular position information (or a portion indicating the plus code) on the list screen M5 of FIG. 11A, the terminal controller 41 may extract some pieces of attachment information (and vehicle IDs) linked with a particular piece of position information, among all pieces of attachment information stored in the server storage 52, and may control the touch panel 42 to display the position-limited list screen M51 as shown in FIG. 12. In addition, the operator may input or set a particular city (and state or prefecture) on another character input screen on the touch panel 42. With this, terminal controller 41 may set a position area of the working vehicle 1, and control the touch panel 42 to display the list similar to FIG. 12.

Alternatively, since Google Map on the touch panel 42 can freely zoom in or out the displayed area with two fingers of the operator, the operator can set the position area of the working vehicles 1 on the map in any desired scaling factors. In other words, the mobile terminal 40 is configured to allow the operator to set the position area of one or more working vehicles 1 through the touch panel 42, and to extract one or more pieces of attachment information based on the set position area and position information of the working vehicles 1 to display them on the position-limited list screen M51 of FIG. 12.

When the operator taps a particular attachment type on the position-limited list screen M51 of FIG. 12, the terminal controller 41 may extracts (or narrow down) one or more pieces of attachment information listed in the position-limited list screen M51 with a particular attachment type to display on the touch panel 42, the type-limited list screen M52 as shown in FIG. 13. When the operator taps or select "rotary cutter" on the position-limited list screen M51 in FIG. 12, the terminal controller 41 may extract one or more pieces of attachment information containing "rotary cutter" as the attachment type and displays the type-limited list screen M52 of FIG. 13. Then, the operator further taps the attachment model number (RC5020) of the attachment ID (A #1836), for example, and taps the button of "Obtain attachment information" on the type-limited list screen M52, the terminal controller 41 can obtain the selected one of pieces of attachment information containing the selected attachment model number from the server storage 52. Similarly, the terminal controller 41 can obtain the selected one of pieces of attachment information containing the selected attachment model number from the vehicle storage 23 of one or more working vehicles 1 arranged in the set position area.

As described above, in a case where the server 50 stores the plurality of pieces of attachment information of attachments 30 which have been attached to one or more working vehicles 1 linked with position information of one or more working vehicles 1, upon operator's selection of the tag ID of the beacon tag 33, the mobile terminal 40 can obtain one of the plurality of pieces of attachment information from the server storage 52 based on position information of the working vehicle 1 selected through the lists of FIGS. 11A, 12, and 13 or the map of FIG. 11B and to cause the tag memory 32 of the beacon tag 33 to store the obtained one of attachment information. In this case, it is not essential for the operator to input the attachment ID of attachment information.

[Variation 4] Although the mobile terminal 40 may be positioned away from one or more attachments 30, it may be close to one or more attachments 30. That is, the mobile terminal 40 may receive the beacon signals from the beacon tags 33 fixed on one or more attachments 30 around the mobile terminal 40, simultaneously obtaining the plurality of pieces of attachment information from the server storage 52 which are selected based on position information of one or more working vehicles 1 positioned in the same area. In particular, the mobile terminal 40 may receive from the beacon tags 33 around the mobile terminal 40, the beacon signals having the RSSIs equal to or greater than the first threshold, to obtain the tag IDs and the plurality of pieces of attachment information (with attachment IDs) contained in the beacon signals. In addition, the mobile terminal 40 may obtain the tag IDs and the plurality of pieces of attachment information (with attachment IDs) from the vehicle storages 23 of one or more working vehicles 1 positioned around the mobile terminal 40. The plurality of pieces of attachment information may be displayed on the touch panel 42 in a form of a list. FIG. 14 is a hybrid tag detection screen M6 on the touch panel 42, listing the tag IDs and the plurality of pieces of attachment information which are stored the vehicle storages 23 of one or more working vehicles 1, and the tag IDs and the plurality of pieces of attachment information which are contained in the beacon signals from the beacon tags 33.

Furthermore, the mobile terminal 40 may obtain the plurality of pieces of attachment information (with attachment IDs) stored in the vehicle storages 23 of one or more working vehicles 1 positioned in different positions away from the mobile terminal 40, via the sever 50.

Listed on the hybrid tag detection screen M6 of FIG. 14 are seven tag IDs and seven pieces of attachment information stored in the vehicle storages 23 of the particular working vehicles 1 (vehicle ID: V #3135) around the mobile terminal 40, and six tag IDs and six pieces of attachment information in the beacon signals received from the beacon tags 33 around the mobile terminal 40 (vehicle ID: N/A). Two or more working vehicles 1 may be positioned around the mobile terminal 40.

In FIG. 14, for example, the mobile terminal 40 does not receive the beacon signals containing two pieces of attachment information with attachment IDs of A #5097 and A #4783, among seven pieces of attachment information stored in the vehicle storages 23 of the working vehicles 1 (vehicle ID: V #3135). With this, the operator recognizes that two of the attachments 30 corresponding to attachment information having the attachment IDs of A #5097 and A #4783 have been moved to another place or area. The terminal controller 41 may be configured to control the touch panel 42 to display two of the attachment information having the attachment IDs of A #5097 and A #4783 with different color or with blinking, to clearly indicate the operator that two of the attachments 30 have been moved to another place or area.

As another example, the mobile terminal 40 receives around the mobile terminal 40, the beacon tag 33 (vehicle ID: N/A) containing the attachment ID (A #2678) of the attachment 30 (flail mower), which is not listed in pieces of attachment information stored in the vehicle storages 23 of the working vehicles 1 (vehicle ID: V #3135). With this, the operator recognizes that the attachment 30 (flail mower) has newly been brought to the same area. The terminal controller 41 may be configured to control the touch panel 42 to display the attachment information having the attachment ID of A #2678 of the attachment 30 (flail mower) with different color or with blinking, to clearly indicate the operator that the attachment 30 (flail mower) has newly been brought to the same area.

As further another example, the mobile terminal 40 receives the beacon signals from the beacon tag 33 around the mobile terminal 40, which contains the tag ID (T #8636) and attachment information including the attachment ID (A #3864), of which tag ID only is inconsistent with corresponding one (T #2035) in attachment information (attachment ID: A #3864) for the same attachment 30 (hole digger) stored in the vehicle storage 23 of the working vehicle 1. With this, the operator recognizes that the beacon tag 33 fixed on the attachment 30 (attachment ID: A #3864) has been replaced with another or new one. The terminal controller 41 may be configured to control the touch panel 42 to display the tag IDs of T #8636 and T #2035 for the same attachment ID (A #3864) of the attachment (hole digger) with different color or with blinking, to clearly indicate the operator that the beacon tag 33 has been replaced with another or new one.

Preferably, the vehicle storage 23 and the server storage 52 according to Variation 4 store the plurality of pieces of attachment information each containing log data indicating the stored and uploaded time as attribute information thereof, similar to ones according to Variation 2. When the beacon tag 33 has been replaced with new one and fixed to the same attachment 30, the mobile terminal 40 may obtain old attachment information including the usage history data such as the hour meter, from the vehicle storage 23 via the server 50, and may store it in the tag memory 32 of the new beacon tag 33. In particular, the operator switches the mobile terminal 40 to the tag setting mode, and selects a particular one of position information in the list screen M5 of FIG. 11A through the touch panel 42. The operator selects a particular one of attachment types listed in the position-limited list screen M51 of FIG. 12, and taps or selects a particular one of pieces of attachment information and taps the button of "Obtain attachment information" on the type-limited list screen M52 of FIG. 13, to obtain a particular piece of attachment information from the server storage 52.

The terminal controller 41 of the mobile terminal 40 is configured to control the terminal transceiver 44 to transmit the beacon signal containing the particular or selected tag ID and the obtained or updated one of pieces of attachment information. The microcomputer 31 of the beacon tag 33 is configured to control the tag memory 32 to store the obtained or updated one of pieces of attachment information in the beacon signal from the terminal transceiver 44, when recognizing that the beacon signal contains its own tag ID. With this, the mobile terminal 40 can overwrite the tag memory 32 with the updated one of pieces of attachment information (with usage history data) obtained from the vehicle storage 23.

It should be noted that as the working vehicle 1 is capable of moving, each of pieces of attachment information stored in the vehicle storage 23 of the working vehicle 1 may be linked with real-time position information of the working vehicle 1 (vehicle ID).

The manufacturer and/or the dealers of the working vehicles 1 may store in advance a plurality of pieces of default attachment information for each of the attachments 30 that can be attached to genuine or default working vehicles 1 in the server storage 52 of the server 50 in a form of a list, which are linked with position information indicating the position of the geographic address of the manufacturer and/or the dealers who manufactures and/or deals the working vehicles 1. With this, the operator can select one of position information indicating, i.e., the geographic address of the manufacturer and/or the dealers in the list, to obtain each one of pieces of the plurality of attachment information which are linked with position information of the working vehicles 1 for each of the attachments 30 that can be attached to default working vehicles 1.

The manufacturer and/or the dealers of the working vehicles 1 may provide an accessible URL (Uniform Resource Locator) on its own website so that the operator may refer to the website to obtain the desired piece of attachment information.

Similarly as described above for the embodiment, the mobile terminal 40 transmits the beacon signal containing the tag ID of the beacon tag 33 and attachment information, when the mobile terminal 40 receives the beacon signal from the beacon tag 33, which has no attachment information or has attachment information to be updated. The microcomputer 31 of the beacon tag 33 controls the tag memory 32 to store attachment information in the beacon signal, when the tag transceiver 34 of the beacon tag 33 receives the beacon signal containing its own tag ID.

The example embodiment of the present invention provides an attachment management system, as described in the following items.

(Item 1) An attachment management system 100 comprising at least one working vehicle 1, a plurality of attachments 30 (30-1, 30-2, . . . , 30-N), each of the plurality of attachments 30 being detachably coupled to the at least one working vehicle 1, a mobile terminal 40 having a touch panel 42, and a plurality of beacon tags 33, each of which is fixed to one of the plurality of attachments 30, and communicates with the mobile terminal 40 through a beacon signal that is compliant with a near field communication standard, each of the plurality of beacon tags 33 including a tag memory 32 to store a tag ID unique to each of the plurality of beacon tags 33, and a tag transceiver 34 capable of transmitting the beacon signal containing the tag ID to the mobile terminal 40, and receiving from the mobile terminal 40, attachment information unique to one of the plurality of attachments 30, on which each of the plurality of beacon tags 33 is fixed, wherein the mobile terminal 40 is switchable between a tag detection mode where the mobile terminal 40 receives the beacon signals from the plurality of beacon tags 33 and does not transmitting attachment information to the plurality of beacon tags 33, and a tag setting mode where the mobile terminal 40 receives the beacon signals from the plurality of beacon tags 33 and is capable of transmitting attachment information to at least one of the plurality of beacon tags 33, the mobile terminal 40 is configured or programmed to display on the touch panel 42, in the tag detection mode, the tag IDs and a plurality of pieces of attachment information stored in the tag memories 32 of the plurality of beacon tags 33 which transmit the beacon signals, and in the tag setting mode, the tag IDs and the plurality of pieces of attachment information stored in the tag memories 32 of the plurality of beacon tags 33 which transmit the beacon signals each having a RSSI (Received Signal Strength Indicator) equal to or greater than a predetermined threshold.

According to the attachment management system 100 recited in Item 1, when a plurality of attachments 30 are positioned around the mobile terminal 40, the mobile terminal 40 displays on the touch panel 42, in the tag detection mode, the plurality of pieces of attachment information in the beacon signals transmitted from the plurality of the beacon tags 33, so that the operator easily recognize location of the plurality of attachments 30 around the mobile terminal 40. Also, the mobile terminal 40 displays on the touch panel 42, in the tag setting mode, the plurality of pieces of attachment information in the beacon signals having the RSSIs equal to or greater than a predetermined threshold so that the operator easily recognize location of the plurality of attachments 30 closer to the mobile terminal 40 and surely store or overwrite attachment information of the attachment 30 in the tag memory 32 of beacon tag 33 fixed to the attachment 30.

(Item 2) The attachment management system 100 according to Item 1, wherein the mobile terminal 40 is configured or programmed to, in the first and tag setting modes, sort and display on the touch panel 42, the tag IDs and the plurality of pieces of attachment information stored in the tag memories 32 of the plurality of beacon tags 33, based on the RSSIs of the beacon signals from the plurality of beacon tags 33. According to the attachment management system 100 recited in Item 2, the mobile terminal 40 sorts and displays the plurality of pieces of attachment information in a descending or ascending order so that the operator easily recognize location of the plurality of attachments 30 closer to the mobile terminal 40.

(Item 3) The attachment management system 100 according to Item 1 or Item 2, wherein the mobile terminal 40 is configured or programmed to, in the tag setting mode, allow an operator to select one of the tag IDs displayed on the touch panel 42, and obtain one of the plurality of pieces of attachment information corresponding to one of the tag IDs selected by the operator through the touch panel 42, and transmit the beacon signal containing the obtained one of the plurality of pieces of attachment information, from the terminal transceiver 44 to the tag transceiver 34 of one of the plurality of beacon tags 33, to cause the tag memory 32 thereof to store the obtained one of the plurality of pieces of attachment information. According to the attachment management system 100 recited in Item 3, the operator can select one of the plurality of tag IDs displayed on the touch panel 42, and the mobile terminal 40 can obtain, in the setting mode, attachment information corresponding to the selected one of the tag IDs to cause the tag memory 32 to store obtained attachment information.

(Item 4) The attachment management system 100 according to any one of Items 1 to 3, wherein the mobile terminal 40 is configured or programmed to, in the tag setting mode, obtain one of the plurality of pieces of attachment information corresponding to the selected one of the tag IDs through input operation of the operator on the touch panel 42. According to the attachment management system 100 recited in Item 4, the mobile terminal 40 can obtain attachment information through input operation of the operator on the touch panel 42.

(Item 5) The attachment management system 100 according to any one of Items 1 to 4, wherein the mobile terminal 40 includes a camera 46, at least one of the plurality of attachments 30 includes an image code recording one of the plurality of pieces of attachment information, and the mobile terminal 40 is configured or programmed to, in the tag setting mode, obtain the one of the plurality of pieces of attachment information corresponding to the selected one of the tag IDs by scanning the image code with the camera 46. According to the attachment management system 100 recited in Item 5, the mobile terminal 40 can readily obtain attachment information by scanning the image code with the camera 46.

(Item 6) The attachment management system 100 according to Item 3, further comprising a server 50 configured or programmed to store the plurality of pieces of attachment information containing attachment IDs unique to each one of the plurality of attachments 30, and to communicate with a terminal communicator 47 of the mobile terminal 40, wherein the mobile terminal 40 is configured or programmed to, in the tag setting mode, obtain one of the attachment IDs corresponding to the selected one of the tag IDs, obtain one of the plurality of pieces of attachment information containing the selected one of the tag IDs by communicating with the server 50 through the terminal communicator 47 based on the obtained one of the attachment IDs, and transmit the beacon signal containing the selected one of the tag IDs and the obtained one of the plurality of pieces of attachment information, from the terminal transceiver 44 to the tag transceiver 34 of one of the plurality of beacon tags 33, to cause the tag memory 32 thereof to store the obtained one of the plurality of pieces of attachment information. According to the attachment management system 100 recited in Item 6, the mobile terminal

40 can readily obtain attachment information based on the obtained attachment ID from the server 50.

(Item 7) The attachment management system 100 according to Item 6, wherein the mobile terminal 40 is configured or programmed to, in the tag setting mode, obtain one of the plurality of pieces of attachment information corresponding to the selected one of the tag IDs through input operation of the operator on the touch panel 42. According to the attachment management system 100 recited in Item 7, the mobile terminal 40 can readily obtain attachment corresponding to the tag ID selected through input operation of the operator.

(Item 8) The attachment management system 100 according to Item 6, wherein the mobile terminal 40 includes a camera 46, at least one of the plurality of attachments 30 includes an image code recording one of the plurality of pieces of attachment information, and the mobile terminal 40 is configured or programmed to, in the tag setting mode, obtain one of the plurality of pieces of attachment information corresponding to the selected one of the tag IDs by scanning the image code with the camera 46. According to the attachment management system 100 recited in Item 8, the mobile terminal 40 can readily obtain attachment ID by scanning the image code with the camera 46.

(Item 9) The attachment management system 100 according to any one of Items 1 to 3, further comprising a server 50 including a sever storage 52 to store the plurality of pieces of attachment information containing a plurality of attachment IDs unique to each one of the plurality of attachments 30, the server 50 communicating with a terminal communicator 47 of the mobile terminal 40, wherein the mobile terminal 40 includes a terminal communicator 47 and a terminal transceiver 44, and is configured or programmed to obtain the plurality of pieces of attachment information stored in the sever storage 52 by communicating with the server 50 through the terminal communicator 47, and the mobile terminal 40 is configured or programmed to, in the tag setting mode, allow an operator to select one of the tag IDs displayed on the touch panel 42, obtain one of the plurality of pieces of attachment information from the sever storage 52, corresponding to one of the tag IDs selected by the operator through the touch panel 42, and transmit the beacon signal containing obtained one of the plurality of pieces of attachment information, from the terminal transceiver 44 to the tag transceiver 34 of one of the plurality of beacon tags 33, to cause the tag memory 32 thereof to store the obtained one of the plurality of pieces of attachment information. According to the attachment management system 100 recited in Item 9, the mobile terminal 40 can readily obtain attachment information from the server storage 52, to cause the tag memory 32 to store obtained attachment information.

(Item 10) The attachment management system 100 according to any one of Items 1 to 9, further comprising a server 50 to communicate with a terminal communicator 47 of the mobile terminal 40, wherein the at least one working vehicle 1 includes a vehicle communicator 27 to communicate with the server 50, and a vehicle storage 23 to store a plurality of pieces of attachment information containing a plurality of attachment IDs unique to each one of the plurality of attachments 30, the mobile terminal 40 includes a terminal transceiver 44, and is configured or programmed to obtain the plurality of pieces of attachment information stored in the vehicle storage 23 by communicating with the vehicle storage 23 via the terminal communicator 47, the server 50, and the vehicle communicator 27, and the mobile terminal 40 is configured or programmed to, in the tag setting mode, allow an operator to select one of the tag IDs displayed on the touch panel 42, obtain one of the plurality of pieces of attachment information from the vehicle storage 23 corresponding to one of the tag IDs selected by the operator through the touch panel 42, and transmit the beacon signal containing obtained attachment information, from the terminal transceiver 44 to the tag transceiver 34 of one of the plurality of beacon tags 33, to cause the tag memory 32 thereof to store the obtained one of the plurality of pieces of attachment information. According to the attachment management system 100 recited in Item 10, the mobile terminal 40 can obtain attachment information linked to position information of the working vehicle 1, to cause the tag memory 32 to store obtained attachment information.

(Item 11) The attachment management system 100 according to any one of Items 1 to 10, further comprising a server 50 to communicate with a terminal communicator 47 of the mobile terminal 40, wherein the mobile terminal 40 includes a terminal transceiver 44, the at least one working vehicle 1 includes a positioning device 26 providing a position information indicating a vehicle position thereof, a vehicle storage 23 to store a plurality of pieces of attachment information of the plurality of attachments 30, and a vehicle communicator 27 to communicate with the server 50, and transmits to the server 50, the plurality of pieces of attachment information linked with position information of the at least one working vehicle 1, the server 50 stores the plurality of pieces of attachment information linked with position information of the at least one working vehicle 1, which are received from the vehicle communicator 27 of the at least one working vehicle 1, and the mobile terminal 40 is configured or programmed to, in the tag setting mode, allow an operator to select one of the plurality of pieces of attachment information displayed on the touch panel 42, and transmit the selected one of the plurality of pieces of attachment information, from the terminal transceiver 44 to the tag transceiver 34 of one of the plurality of beacon tags 33, to cause the tag memory 32 thereof to store the selected one of the plurality of pieces of attachment information. According to the attachment management system 100 recited in Item 11, the mobile terminal 40 can obtain attachment information linked to position information of the working vehicle 1 from the vehicle storage 23 via the server 50, to cause the tag memory 32 to store obtained attachment information.

(Item 12) The attachment management system 100 according to any one of Items 1 to 11, further comprising a server 50 to communicate with a terminal communicator 47 of the mobile terminal 40, wherein the mobile terminal 40 includes a terminal transceiver 44, the at least one working vehicle 1 includes a positioning device 26 providing a position information indicating a vehicle position thereof, a vehicle storage 23 to store a plurality of pieces of attachment information of the plurality of attachments 30, and a vehicle communicator 27 to communicate with the server 50, and transmits to the server 50, the plurality of pieces of attachment information linked with position information of the at least one working vehicle 1, the server 50 stores the plurality of pieces of attachment information linked with position information of the at least one working vehicle 1, which are received from the vehicle communicator 27 of the at least one working vehicle 1, and the mobile terminal 40 is configured or programmed, in the tag detection mode, to obtain from the server 50, and display on the touch panel 42, the plurality of pieces of attachment information and position information linked with each one of the plurality of pieces of attachment information, which are stored in the vehicle storage 23 of the at least one working vehicle 1.

According to the attachment management system 100 recited in Item 12, the mobile terminal 40 can display on the touch panel 42, in the tag detection mode, the plurality of pieces of attachment information linked to position information of the plurality of working vehicles 1 from the vehicle storage 23 via the server 50, to cause the tag memory 32 to store obtained attachment information.

(Item 13) The attachment management system 100 according to Item 12, wherein the mobile terminal 40 is configured or programmed, in the tag detection mode, to display on the touch panel 42, the plurality of pieces of attachment information and position information linked with each one of the plurality of pieces of attachment information, which are stored in the vehicle storage 23 of the at least one working vehicle 1, and the plurality of pieces of attachment information, which are stored in the tag memories 32 of the plurality of beacon tags 33 which transmit the beacon signals. According to the attachment management system 100 recited in Item 13, the mobile terminal 40 can display on the touch panel 42, in the tag detection mode, the plurality of pieces of attachment information linked to position information of the plurality of working vehicles 1 stored in the vehicle storage 23, and the plurality of pieces of attachment information in the beacon signals received from the beacon tags 33.

(Item 14) The attachment management system 100 according to any one of Items 11 to 13, wherein the mobile terminal 40 is configured or programmed to allow an operator to set a position area of the at least one working vehicle 1, extract at least one of the plurality of pieces of attachment information from the server 50, based on the set position area and position information of the at least one working vehicle 1, and display at least one of the plurality of pieces of attachment information on the touch panel 42. According to the attachment management system 100 recited in Item 14, the mobile terminal 40 can extract and display on the touch panel 42, at least one attachment information based on the position area set by the operator and position information of the working vehicle 1.

(Item 15) The attachment management system 100 according to Item 14, wherein the mobile terminal 40 is configured or programmed to display a map and at least one mark indicating the vehicle position of the at least one working vehicle 1 on the map based on position information thereof, and allow the operator to set the position area of the at least one working vehicle 1 on the map. According to the attachment management system 100 recited in Item 15, the mobile terminal 40 can allow the operator to set the position area of the at least one working vehicle 1 on the map.

(Item 16) The attachment management system 100 according to any one of Items 1 to 15, further comprising a server 50 to communicate with a terminal communicator 47 of the mobile terminal 40, the server 50 including a server storage 52 to store a plurality of pieces of attachment information of the plurality of attachments 30, wherein the at least one working vehicle 1 includes a plurality of working vehicles 1, the mobile terminal 40 includes a terminal transceiver 44, each of the plurality of working vehicles 1 includes a positioning device 26 providing a position information indicating a vehicle position thereof, a vehicle storage 23 to store the plurality of pieces of attachment information of the plurality of attachments 30, and a vehicle communicator 27 to communicate with the server 50, and transmits to the server 50, the plurality of pieces of attachment information linked with position information of each of the plurality of working vehicles 1, the server storage 52 stores the plurality of pieces of attachment information linked with position information of each of the plurality of working vehicles 1, which are received from each of the vehicle communicator 27s of the plurality of working vehicles 1, the mobile terminal 40 displays the plurality of pieces of attachment information linked with position information of each of the plurality of working vehicles 1, which are stored in the server storage 52, the mobile terminal 40 is configured or programmed to, in the tag setting mode, allow an operator to select one of the plurality of pieces of attachment information displayed on the touch panel 42, and transmit one of the plurality of pieces of attachment information selected by the operator, from the terminal transceiver 44 to the tag transceiver 34 of one of the plurality of beacon tags 33, to cause the tag memory 32 thereof to store the selected one of the plurality of pieces of attachment information. According to the attachment management system 100 recited in Item 16, the mobile terminal 40 can obtain attachment information linked to position information of the working vehicle 1 from the server 50.

(Item 17) The attachment management system 100 according to Item 16, wherein the mobile terminal 40 is configured or programmed to allow an operator to set a position area of the plurality of working vehicles 1, extract at least one of the plurality of pieces of attachment information from the server storage 52, based on the set position area and position information of the plurality of working vehicles 1, and display the plurality of pieces of attachment information on the touch panel 42. According to the attachment management system 100 recited in Item 17, the mobile terminal 40 can extract at least one attachment information based on the position area set by the operator and position information of the plurality of working vehicles 1 from the server storage 52.

(Item 18) The attachment management system 100 according to Item 17, wherein the mobile terminal 40 is configured or programmed to display a map and marks indicating the vehicle positions of the plurality of working vehicles 1 on the map based on position information thereof, and allow the operator to set the position area of the plurality of working vehicles 1 on the map. According to the attachment management system 100 recited in Item 18, the operator can set the position area of the working vehicles 1 on the map.

(Item 19) The attachment management system 100 according to any one of Items 1 to 18, wherein the mobile terminal 40 has a switch to allow the operator to select either one of the tag detection mode and the tag setting mode. According to the attachment management system 100 recited in Item 19, the operator can select the tag detection mode or the tag setting mode.

(Item 20) The attachment management system 100 according to any one of Items 1 to 18, wherein the mobile terminal 40 is configured or programmed to, in the tag detection mode, display on the touch panel 42, the tag IDs and attachment information stored in each of the tag memories 32 of the plurality of beacon tags 33 which transmit the beacon signals, and in the tag setting mode, display on the touch panel 42, the tag IDs stored in each of the tag memories 32 of the plurality of beacon tags 33 which transmit the beacon signals having the RSSIs equal to or greater than a predetermined threshold. According to the attachment management system 100 recited in Item 20, the mobile terminal 40 can change the RSSIs of the beacon signals displayed on the touch panel 42 depending on the tag detection mode or tag setting mode.

(Item 21) An attachment management system 100 comprising a server 50 including a server storage 52, at least one working vehicle 1 including a vehicle communicator 27 to communicate with the server 50, a plurality of attachments 30 detachably coupled to the at least one working vehicle 1, a mobile terminal 40 including a terminal communicator 47 to communicate with the server 50, a terminal transceiver 44, and a touch panel 42, and a plurality of beacon tags 33, each of which is fixed to one of the plurality of attachments 30, and communicates with the mobile terminal 40 through a beacon signal that is compliant with a near field communication standard, the server storage 52 storing a plurality of pieces of attachment information of the plurality of attachments 30, each of the plurality of beacon tags 33 including a tag memory 32 to store a tag ID unique to each of the plurality of beacon tags 33, and a tag transceiver 34 capable of transmitting the beacon signal containing the tag ID to the mobile terminal 40, and receiving from the mobile terminal 40, attachment information unique to one of the plurality of attachments 30, on which each of the plurality of beacon tags 33 is fixed, wherein the mobile terminal 40 is configured or programmed to, obtain and display on the touch panel 42, the plurality of pieces of attachment information of the plurality of attachments 30, by communicating with the server 50 through the terminal communicator 47, allow an operator to select one of the plurality of pieces of attachment information displayed on the touch panel 42, and transmit one of the plurality of pieces of attachment information displayed on the touch panel 42 and selected by the operator, from the terminal transceiver 44 to the tag transceiver 34 of one of the plurality of beacon tags 33, to cause the tag memory 32 thereof to store the selected one of the plurality of pieces of attachment information. According to the attachment management system 100 recited in Item 21, the mobile terminal 40 can obtain attachments 30, to cause the tag memory 32 to store attachment information.

(Item 22) The attachment management system 100 according to Item 21, wherein the at least one working vehicle 1 includes a positioning device 26 providing position information indicating a vehicle position thereof, and a vehicle storage 23 to store the plurality of pieces of attachment information of the plurality of attachments 30, the vehicle communicator 27 transmits to the server 50, the plurality of pieces of attachment information of the plurality of attachments 30, which are linked with position information of the at least one working vehicle 1, the vehicle communicator 27 transmits to the server 50, the plurality of pieces of attachment information of the plurality of attachments 30, which are linked with position information of the at least one working vehicle 1, the sever storage 52 stores the plurality of pieces of attachment information of the plurality of attachments 30, which are linked with position information of the at least one working vehicle 1, and the mobile terminal 40 is configured or programmed to, obtain and display on the touch panel 42, the plurality of pieces of attachment information of the plurality of attachments 30 stored in the sever storage 52, which are linked with position information of the at least one working vehicle 1, by communicating with the server 50 through the terminal communicator 47, allow an operator to select one of the plurality of pieces of attachment information displayed on the touch panel 42, based on position information of the at least one working vehicle 1, and transmit the selected one of the plurality of pieces of attachment information, from the terminal transceiver 44 to one of the plurality of beacon tags 33, to cause the tag memory 32 thereof to store the selected one of the plurality of pieces of attachment information. According to the attachment management system 100 recited in Item 22, the mobile terminal 40 can obtain attachment information linked with position information of the working vehicle 1 from the vehicle storage 23, to cause the tag memory 32 to store attachment information.

(Item 23) The attachment management system 100 according to Item 21 or 23, wherein the at least one working vehicle 1 includes a plurality of working vehicles 1, and one of the plurality of working vehicles 1 is located away from another of the plurality of working vehicles 1. According to the attachment management system 100 recited in Item 23, the mobile terminal 40 can obtain attachment information from the vehicle storages 23 of the working vehicles 1 located away from each other.

(Item 24) The attachment management system 100 according to any one of Items 21 to 23, wherein the mobile terminal 40 is configured or programmed to, allow the operator to set a position area of the at least one working vehicle 1, extract at least one of the plurality of pieces of attachment information from the server storage 52, based on the set position area and position information of the at least one working vehicle 1, and display the at least one of the plurality of pieces of attachment information on the touch panel 42. According to the attachment management system 100 recited in Item 24, the mobile terminal 40 can extract at least one attachment information from the server storage 52, based on the position area set by the operator and position information of the at least one working vehicle 1.

(Item 25) An attachment management system 100 comprising a server 50 including a server storage 52, at least one working vehicle 1 including a vehicle communicator 27 to communicate with the server 50, a plurality of attachments 30 each detachably coupled to the at least one working vehicle 1, a mobile terminal 40 including a terminal communicator 47 to communicate with the server 50, a terminal transceiver 44, and a touch panel 42, and a plurality of beacon tags 33, each of which is fixed to one of the plurality of attachments 30, and communicates with the mobile terminal 40 through a beacon signal that is compliant with a near field communication standard, wherein the server storage 52 stores a plurality of pieces of attachment information containing a plurality of attachment IDs unique to each one of the plurality of attachments 30, each of the plurality of beacon tags 33 includes a tag memory 32 to store a tag ID unique to each of the plurality of beacon tags 33, and a tag transceiver 34 capable of transmitting the beacon signal containing the tag ID to the mobile terminal 40, and receiving from the mobile terminal 40, attachment information unique to one of the plurality of attachments 30, on which each of the plurality of beacon tags 33 is fixed, wherein the mobile terminal 40 is configured or programmed to, obtain one of the plurality of attachment IDs of the plurality of pieces of attachment information through operation of an operator, obtain one of the plurality of pieces of attachment information linked with the obtained one of the plurality of attachment IDs, based on the obtained one of the plurality of attachment IDs, from the server storage 52 by communicating with the server 50 through the terminal communicator 47, and transmit the beacon signal containing the obtained one of the plurality of pieces of attachment information, from the terminal transceiver 44 to the tag transceiver 34 of one of the plurality of beacon tags 33, to cause the tag memory 32 thereof to store the obtained one of the plurality of pieces of attachment information. According to the attachment management system 100 recited in Item 25, the mobile terminal 40 can obtain attachment information from the server storage 52, to cause the tag memory 32 to store obtained attachment information.

(Item 26) The attachment management system 100 according to Item 25, wherein the mobile terminal 40 is configured or programmed to, display on the touch panel 42, at least one of the plurality of pieces of attachment information stored in the tag memory 32 of at least one of the plurality of beacon tags 33 from which the mobile terminal 40 receives the beacon signals having the RSSIs (Received Signal Strength Indicator) equal to or greater than a predetermined threshold, allow the operator to select one of the plurality of attachment IDs displayed on the touch panel 42, and obtain one of the plurality of pieces of attachment information linked with the selected one of the plurality of attachment IDs, based on the selected one of the plurality of attachment IDs, from the server storage 52, by communicating with the server 50 through the terminal communicator 47. According to the attachment management system 100 recited in Item 26, the operator can select one of the tag IDs displayed on the touch panel 42, and the mobile terminal 40 can obtain the attachment ID of attachment information.

(Item 27) The attachment management system 100 according to Item 25, wherein the mobile terminal 40 is configured or programmed to obtain one of the plurality of attachment IDs through input operation of the operator. According to the attachment management system 100 recited in Item 27, the mobile terminal 40 can obtain one attachment ID through input operation of the operator.

(Item 28) The attachment management system 100 according to Item 25 or 26, wherein the mobile terminal 40 includes a camera 46, at least one of the plurality of attachments 30 includes an image code recording attachment information, and the mobile terminal 40 is configured or programmed to obtain one of the plurality of attachment IDs by scanning the image code with the camera 46. According to the attachment management system 100 recited in Item 28, the mobile terminal 40 can readily obtain attachment information by scanning the image code with the camera 46.

(Item 29) The attachment management system 100 according to any one of Items 25 to 28, wherein the at least one working vehicle 1 includes a positioning device 26 providing position information indicating a vehicle position thereof, and a vehicle storage 23 to store the plurality of pieces of attachment information of the plurality of attachments 30, the vehicle communicator 27 transmits to the server 50, the plurality of pieces of attachment information of the plurality of attachments 30, which are linked with position information of the at least one working vehicle 1, the sever storage 52 stores the plurality of pieces of attachment information of the plurality of attachments 30, which are linked with position information of the at least one working vehicle 1, and the mobile terminal 40 is configured or programmed to, obtain and display on the touch panel 42, the plurality of pieces of attachment information of the plurality of attachments 30, which are linked with position information of the at least one working vehicle 1, by communicating with the server 50 through the terminal communicator 47, allow an operator to select one of the plurality of pieces of attachment information displayed on the touch panel 42, based on position information of the at least one working vehicle 1, and transmit the selected one of the plurality of pieces of attachment information, from the terminal transceiver 44 to the tag transceiver 34 of one of the plurality of beacon tags 33, to cause the tag memory 32 thereof to store the selected one of the plurality of pieces of attachment information. According to the attachment management system 100 recited in Item 29, the mobile terminal 40 can obtain attachment information linked with position information of the working vehicle 1, from the server storage 52, to cause the tag memory 32 to store obtained attachment information.

(Item 30) The attachment management system 100 according to any one of Items 25 to 29, wherein the at least one working vehicle 1 includes a plurality of working vehicles 1, and one of the plurality of working vehicles 1 is located away from another of the plurality of working vehicles 1. According to the attachment management system 100 recited in Item 30, the mobile terminal 40 can obtain attachment information from the vehicle storages 23 of the working vehicles 1 located away from each other, to cause the tag memory 32 to store obtained attachment information.

(Item 31) The attachment management system 100 according to any one of Items 25 to 30, wherein the mobile terminal 40 is configured or programmed to, allow the operator to set a position area of the at least one working vehicle 1, extract at least one of the plurality of pieces of attachment information from the server storage 52, based on the position area and position information of the at least one working vehicle 1, and display the at least one of the plurality of pieces of attachment information on the touch panel 42. According to the attachment management system 100 recited in Item 31, the mobile terminal 40 can extract at least one attachment information from the server storage 52, based on the position area set by the operator and position information of the at least one working vehicle 1.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An attachment management system for managing a plurality of attachments usable by at least one working vehicle, said attachment management system comprising:

the at least one working vehicle;

the plurality of attachments, each of the plurality of attachments being configured to be detachably coupled to the at least one working vehicle;

a mobile terminal having a terminal interface, wherein the mobile terminal is configured to be in communication with a vehicle communicator, and a plurality of communication tags, each of which is fixed to one of the plurality of attachments for the at least one working vehicle, and communicates with the mobile terminal through a wireless signal that is compliant with a near field communication standard, each of the plurality of communication tags including— a tag memory to store a tag identifier unique to each of the plurality of communication tags, and a tag transceiver capable of transmitting the wireless signal containing the tag identifier to the mobile terminal, and receiving from the mobile terminal, attachment information unique to one of the plurality of attachments for the at least one working vehicle, on which each of the plurality of communication tags is fixed, wherein the mobile terminal is switchable between— a first mode where the mobile terminal receives the wireless signals from the plurality of communication tags and does not transmit attachment information to the plurality of communication tags, and a second mode where the mobile terminal receives the wireless signals from the plurality of communication tags and is capable of transmitting attachment information to at least one of the plurality of communication tags that transmits wireless signals having RSSIs (Received Signal Strength Indicators) equal to or greater than a predetermined threshold, wherein the mobile terminal is configured or programmed to display on the terminal interface— in the first mode, the tag identifiers and a plurality of pieces of attachment information stored in the tag memories of the plurality of communication tags which transmit the wireless signals, and in the second mode, the tag identifiers and the plurality of pieces of attachment information stored in the tag memories of the plurality of communication tags which transmit the wireless signals each having RSSIs equal to or greater than the predetermined threshold.

2. The attachment management system according to claim 1, wherein the mobile terminal is configured or programmed to, in the first and second modes, sort and display on the terminal interface, the tag identifiers and the plurality of pieces of attachment information stored in the tag memories of the plurality of communication tags, based on the RSSIs of the wireless signals from the plurality of communication tags.

3. The attachment management system according to claim 1, wherein the mobile terminal is configured or programmed to, in the second mode, allow an operator to select one of the tag identifiers displayed on the terminal interface, and obtain one of the plurality of pieces of attachment information corresponding to one of the tag identifiers selected by the operator through the terminal interface, and transmit the wireless signal containing the obtained one of the plurality of pieces of attachment information, from the terminal transceiver to the tag transceiver of one of the plurality of communication tags, to cause the tag memory thereof to store the obtained one of the plurality of pieces of attachment information.

4. The attachment management system according to claim 3, wherein the mobile terminal is configured or programmed to, in the second mode, obtain one of the plurality of pieces of attachment information corresponding to the selected one of the tag identifiers through input operation of the operator on the terminal interface.

5. The attachment management system according to claim 3, wherein the mobile terminal includes a camera, at least one of the plurality of attachments includes an image code recording one of the plurality of pieces of attachment information, and the mobile terminal is configured or programmed to, in the second mode, obtain the one of the plurality of pieces of attachment information corresponding to the selected one of the tag identifiers by scanning the image code with the camera.

6. The attachment management system according to claim 3, further comprising:

a server configured or programmed to store the plurality of pieces of attachment information containing attachment identifiers unique to each one of the plurality of attachments, and to communicate with a terminal communicator of the mobile terminal, wherein the mobile terminal is configured or programmed to, in the second mode, obtain one of the attachment identifiers corresponding to the selected one of the tag identifiers, obtain one of the plurality of pieces of attachment information containing the selected one of the tag identifiers by communicating with the server through the terminal communicator based on the obtained one of the attachment identifiers, and transmit the wireless signal containing the selected one of the tag identifiers and the obtained one of the plurality of pieces of attachment information, from the terminal transceiver to the tag transceiver of one of the plurality of communication tags, to cause the tag memory thereof to store the obtained one of the plurality of pieces of attachment information.

7. The attachment management system according to claim 6, wherein the mobile terminal is configured or programmed to, in the second mode, obtain one of the plurality of pieces of attachment information corresponding to the selected one of the tag identifiers through input operation of the operator on the terminal interface.

8. The attachment management system according to claim 6, wherein the mobile terminal includes a camera, at least one of the plurality of attachments includes an image code recording one of the plurality of pieces of attachment information, and the mobile terminal is configured or programmed to, in the second mode, obtain one of the plurality of pieces of attachment information corresponding to the selected one of the tag identifiers by scanning the image code with the camera.

9. The attachment management system according to claim 1, further comprising:

a server including a sever storage to store the plurality of pieces of attachment information containing a plurality of attachment identifiers unique to each one of the plurality of attachments, the server communicating with a terminal communicator of the mobile terminal, wherein the mobile terminal includes a terminal communicator and a terminal transceiver, and is configured or programmed to obtain the plurality of pieces of attachment information stored in the sever storage by communicating with the server through the terminal communicator, and the mobile terminal is configured or programmed to, in the second mode, allow an operator to select one of the tag identifiers displayed on the terminal interface, obtain one of the plurality of pieces of attachment information from the sever storage, corresponding to one of the tag identifiers selected by the operator through the terminal interface, and transmit the wireless signal containing obtained one of the plurality of pieces of attachment information, from the terminal transceiver to the tag transceiver of one of the plurality of communication tags, to cause the tag memory thereof to store the obtained one of the plurality of pieces of attachment information.

10. The attachment management system according to claim 1, further comprising:

a server to communicate with a terminal communicator of the mobile terminal, wherein the at least one working vehicle includes a vehicle communicator to communicate with the server, and a vehicle storage to store a plurality of pieces of attachment information containing a plurality of attachment identifiers unique to each one of the plurality of attachments, the mobile terminal includes a terminal transceiver, and is configured or programmed to obtain the plurality of pieces of attachment information stored in the vehicle storage by communicating with the vehicle storage via the terminal communicator, the server, and the vehicle communicator, and the mobile terminal is configured or programmed to, in the second mode, allow an operator to select one of the tag identifiers displayed on the terminal interface, obtain one of the plurality of pieces of attachment information from the vehicle storage corresponding to one of the tag identifiers selected by the operator through the terminal interface, and transmit the wireless signal containing obtained attachment information, from the terminal transceiver to the tag transceiver of one of the plurality of communication tags, to cause the tag memory thereof to store the obtained one of the plurality of pieces of attachment information.

11. The attachment management system according to claim 1, further comprising:

a server to communicate with a terminal communicator of the mobile terminal, wherein the mobile terminal includes a terminal transceiver, the at least one working vehicle includes a positioning device providing a position information indicating a vehicle position thereof, a vehicle storage to store a plurality of pieces of attachment information of the plurality of attachments, and a vehicle communicator to communicate with the server, and transmits to the server, the plurality of pieces of attachment information linked with position information of the at least one working vehicle, the server stores the plurality of pieces of attachment information linked with position information of the at least one working vehicle, which are received from the vehicle communicator of the at least one working vehicle, and the mobile terminal is configured or programmed to, in the second mode, allow an operator to select one of the plurality of pieces of attachment information displayed on the terminal interface, and transmit the selected one of the plurality of pieces of attachment information, from the terminal transceiver to the tag transceiver of one of the plurality of communication tags, to cause the tag memory thereof to store the selected one of the plurality of pieces of attachment information.

12. The attachment management system according to claim 11, wherein the mobile terminal is configured or programmed to allow an operator to set a position area of the at least one working vehicle, extract at least one of the plurality of pieces of attachment information from the server, based on the set position area and position information of the at least one working vehicle, and display at least one of the plurality of pieces of attachment information on the terminal interface.

13. The attachment management system according to claim 12, wherein the mobile terminal is configured or programmed to display a map and at least one mark indicating the vehicle position of the at least one working vehicle on the map based on position information thereof, and allow the operator to set the position area of the at least one working vehicle on the map.

14. The attachment management system according to claim 1, further comprising:

a server to communicate with a terminal communicator of the mobile terminal, wherein the mobile terminal includes a terminal transceiver, the at least one working vehicle includes a positioning device providing a position information indicating a vehicle position thereof, a vehicle storage to store a plurality of pieces of attachment information of the plurality of attachments, and a vehicle communicator to communicate with the server, and transmits to the server, the plurality of pieces of attachment information linked with position information of the at least one working vehicle, the server stores the plurality of pieces of attachment information linked with position information of the at least one working vehicle, which are received from the vehicle communicator of the at least one working vehicle, and the mobile terminal is configured or programmed, in the first mode, to obtain from the server, and display on the terminal interface, the plurality of pieces of attachment information and position information linked with each one of the plurality of pieces of attachment information, which are stored in the vehicle storage of the at least one working vehicle.

15. The attachment management system according to claim 14, wherein the mobile terminal is configured or programmed, in the first mode, to display on the terminal interface, the plurality of pieces of attachment information and position information linked with each one of the plurality of pieces of attachment information, which are stored in the vehicle storage of the at least one working vehicle, and the plurality of pieces of attachment information, which are stored in the tag memories of the plurality of communication tags which transmit the wireless signals.

16. The attachment management system according to claim 1, further comprising:

a server to communicate with a terminal communicator of the mobile terminal, the server including a server storage to store a plurality of pieces of attachment information of the plurality of attachments, wherein the at least one working vehicle includes a plurality of working vehicles, the mobile terminal includes a terminal transceiver, each of the plurality of working vehicles includes a positioning device providing a position information indicating a vehicle position thereof, a vehicle storage to store the plurality of pieces of attachment information of the plurality of attachments, and a vehicle communicator to communicate with the server, and transmits to the server, the plurality of pieces of attachment information linked with position information of each of the plurality of working vehicles, the server storage stores the plurality of pieces of attachment information linked with position information of each of the plurality of working vehicles, which are received from each of the vehicle communicators of the plurality of working vehicles, the mobile terminal displays the plurality of pieces of attachment information linked with position information of each of the plurality of working vehicles, which are stored in the server storage, the mobile terminal is configured or programmed to, in the second mode, allow an operator to select one of the plurality of pieces of attachment information displayed on the terminal interface, and transmit one of the plurality of pieces of attachment information selected by the operator, from the terminal transceiver to the tag transceiver of one of the plurality of communication tags, to cause the tag memory thereof to store the selected one of the plurality of pieces of attachment information.

17. The attachment management system according to claim 16, wherein the mobile terminal is configured or programmed to allow an operator to set a position area of the plurality of working vehicles, extract at least one of the plurality of pieces of attachment information from the server storage, based on the set position area and position information of the plurality of working vehicles, and display the plurality of pieces of attachment information on the terminal interface.

18. The attachment management system according to claim 17, wherein the mobile terminal is configured or programmed to display a map and marks indicating the vehicle positions of the plurality of working vehicles on the map based on position information thereof, and allow the operator to set the position area of the plurality of working vehicles on the map.

19. The attachment management system according to claim 1, wherein the mobile terminal has a switch to allow the operator to select either one of the first mode and the second mode.

20. The attachment management system according to claim 1, wherein the mobile terminal is configured or programmed to, in the first mode, display on the terminal interface, the tag identifiers and attachment information stored in each of the tag memories of the plurality of communication tags which transmit the wireless signals, and in the second mode, display on the terminal interface, the tag identifiers stored in each of the tag memories of the plurality of communication tags which transmit the wireless signals having the RSSIs equal to or greater than a predetermined threshold.

21. An attachment management system for managing a plurality of attachments usable by at least one working vehicle, said attachment management system comprising:

a server including a server storage;

the at least one working vehicle including a vehicle communicator to communicate with the server;

the plurality of attachments configured to be detachably coupled to the at least one working vehicle;

a mobile terminal including a terminal communicator to communicate with the server, a terminal transceiver, and a terminal interface, wherein the mobile terminal is configured to be in communication with the vehicle communicator via the server; and a plurality of communication tags, each of which is fixed to one of the plurality of attachments for the at least one working vehicle, and communicates with the mobile terminal through a wireless signal that is compliant with a near field communication standard, the server storage storing a plurality of pieces of attachment information of the plurality of attachments, each of the plurality of communication tags including— a tag memory to store a tag identifier unique to each of the plurality of communication tags, and a tag transceiver capable of transmitting the wireless signal containing the tag identifier to the mobile terminal, and receiving from the mobile terminal, attachment information unique to one of the plurality of attachments for the at least one working vehicle, on which each of the plurality of communication tags is fixed, wherein the mobile terminal is configured or programmed to— obtain and display on the terminal interface, the plurality of pieces of attachment information of the plurality of attachments for the at least one working vehicle, by communicating with the server through the terminal communicator, allow an operator to select one of the plurality of pieces of attachment information displayed on the terminal interface, and transmit one of the plurality of pieces of attachment information displayed on the terminal interface and selected by the operator, from the terminal transceiver to the tag transceiver of one of the plurality of communication tags that transmits wireless signals having RSSIs (Received Signal Strength Indicators) equal to or greater than a predetermined threshold, to cause the tag memory thereof to store the selected one of the plurality of pieces of attachment information.

22. The attachment management system according to claim 21, wherein the at least one working vehicle includes a positioning device providing position information indicating a vehicle position thereof, and a vehicle storage to store the plurality of pieces of attachment information of the plurality of attachments, the vehicle communicator transmits to the server, the plurality of pieces of attachment information of the plurality of attachments, which are linked with position information of the at least one working vehicle, the vehicle communicator transmits to the server, the plurality of pieces of attachment information of the plurality of attachments, which are linked with position information of the at least one working vehicle, the sever storage stores the plurality of pieces of attachment information of the plurality of attachments, which are linked with position information of the at least one working vehicle, and the mobile terminal is configured or programmed to, obtain and display on the terminal interface, the plurality of pieces of attachment information of the plurality of attachments stored in the sever storage, which are linked with position information of the at least one working vehicle, by communicating with the server through the terminal communicator, allow an operator to select one of the plurality of pieces of attachment information displayed on the terminal interface, based on position information of the at least one working vehicle, and transmit the selected one of the plurality of pieces of attachment information, from the terminal transceiver to one of the plurality of communication tags, to cause the tag memory thereof to store the selected one of the plurality of pieces of attachment information.

23. The attachment management system according to claim 22, wherein the at least one working vehicle includes a plurality of working vehicles, and one of the plurality of working vehicles is located away from another of the plurality of working vehicles.

24. The attachment management system according to claim 22, wherein the mobile terminal is configured or programmed to, allow the operator to set a position area of the at least one working vehicle, extract at least one of the plurality of pieces of attachment information from the server storage, based on the set position area and position information of the at least one working vehicle, and display the at least one of the plurality of pieces of attachment information on the terminal interface.

25. An attachment management system for managing a plurality of attachments usable by at least one working vehicle, said attachment management system comprising:

a server including a server storage;

the at least one working vehicle including a vehicle communicator to communicate with the server;

the plurality of attachments each configured to be detachably coupled to the at least one working vehicle;

a mobile terminal including a terminal communicator to communicate with the server, a terminal transceiver, and a terminal interface, wherein the mobile terminal is configured to be in communication with the vehicle communicator via the server; and a plurality of communication tags, each of which is fixed to one of the plurality of attachments, and communicates with the mobile terminal through a wireless signal that is compliant with a near field communication standard, wherein the server storage stores a plurality of pieces of attachment information containing a plurality of attachment identifiers unique to each one of the plurality of attachments for the at least one working vehicle, each of the plurality of communication tags includes— a tag memory to store a tag identifier unique to each of the plurality of communication tags, and a tag transceiver capable of transmitting the wireless signal containing the tag identifier to the mobile terminal, and receiving from the mobile terminal, attachment information unique to one of the plurality of attachments for the at least one working vehicle, on which each of the plurality of communication tags is fixed, wherein the mobile terminal is configured or programmed to— obtain one of the plurality of attachment identifiers of the plurality of pieces of attachment information through operation of an operator, obtain one of the plurality of pieces of attachment information linked with the obtained one of the plurality of attachment identifiers, based on the obtained one of the plurality of attachment identifiers, from the server storage by communicating with the server through the terminal communicator, and transmit the wireless signal containing the obtained one of the plurality of pieces of attachment information, from the terminal transceiver to the tag transceiver of one of the plurality of communication tags that transmits wireless signals having RSSIs (Received Signal Strength Indicators) equal to or greater than a predetermined threshold, to cause the tag memory thereof to store the obtained one of the plurality of pieces of attachment information.

26. The attachment management system according to claim 25, wherein the mobile terminal is configured or programmed to, display on the terminal interface, at least one of the plurality of pieces of attachment information stored in the tag memory of at least one of the plurality of communication tags from which the mobile terminal receives the wireless signals having the RSSIs (Received Signal Strength Indicators) equal to or greater than a predetermined threshold, allow the operator to select one of the plurality of attachment identifiers displayed on the terminal interface, and obtain one of the plurality of pieces of attachment information linked with the selected one of the plurality of attachment identifiers, based on the selected one of the plurality of attachment identifiers, from the server storage, by communicating with the server through the terminal communicator.

27. The attachment management system according to claim 25, wherein the mobile terminal is configured or programmed to obtain one of the plurality of attachment identifiers through input operation of the operator.

28. The attachment management system according to claim 25, wherein the mobile terminal includes a camera, at least one of the plurality of attachments includes an image code recording attachment information, and the mobile terminal is configured or programmed to obtain one of the plurality of attachment identifiers by scanning the image code with the camera.

29. The attachment management system according to claim 25, wherein the at least one working vehicle includes a positioning device providing position information indicating a vehicle position thereof, and a vehicle storage to store the plurality of pieces of attachment information of the plurality of attachments, the vehicle communicator transmits to the server, the plurality of pieces of attachment information of the plurality of attachments, which are linked with position information of the at least one working vehicle, the sever storage stores the plurality of pieces of attachment information of the plurality of attachments, which are linked with position information of the at least one working vehicle, and the mobile terminal is configured or programmed to, obtain and display on the terminal interface, the plurality of pieces of attachment information of the plurality of attachments, which are linked with position information of the at least one working vehicle, by communicating with the server through the terminal communicator, allow an operator to select one of the plurality of pieces of attachment information displayed on the terminal interface, based on position information of the at least one working vehicle, and transmit the selected one of the plurality of pieces of attachment information, from the terminal transceiver to the tag transceiver of one of the plurality of communication tags, to cause the tag memory thereof to store the selected one of the plurality of pieces of attachment information.

30. The attachment management system according to claim 25, wherein the at least one working vehicle includes a plurality of working vehicles, and one of the plurality of working vehicles is located away from another of the plurality of working vehicles.

31. The attachment management system according to claim 25, wherein the mobile terminal is configured or programmed to, allow the operator to set a position area of the at least one working vehicle, extract at least one of the plurality of pieces of attachment information from the server storage, based on the position area and position information of the at least one working vehicle, and display the at least one of the plurality of pieces of attachment information on the terminal interface.

* * * * *